United States Patent
Fukada et al.

(10) Patent No.: US 9,276,670 B2
(45) Date of Patent: Mar. 1, 2016

(54) SELF-DIAGNOSTIC METHOD FOR PON PROTECTION SYSTEM, AND PON PROTECTION SYSTEM

(71) Applicant: NIPPON TELEGRAPH AND TELEPHONE CORPORATION, Tokyo (JP)

(72) Inventors: Youichi Fukada, Yokosuka (JP); Takashi Mitsui, Yokosuka (JP); Takeshi Sakamoto, Yokosuka (JP); Naoto Yoshimoto, Yokosuka (JP); Yasutaka Kimura, Yokosuka (JP)

(73) Assignee: Nippon Telegraoh and Telephone Corporation, Tokyo (JP)

( * ) Notice: Subject to any disclaimer, the term of this patent is extended or adjusted under 35 U.S.C. 154(b) by 21 days.

(21) Appl. No.: 14/241,280

(22) PCT Filed: Nov. 15, 2012

(86) PCT No.: PCT/JP2012/079666
§ 371 (c)(1),
(2) Date: Feb. 26, 2014

(87) PCT Pub. No.: WO2013/077249
PCT Pub. Date: May 30, 2013

(65) Prior Publication Data
US 2015/0003822 A1    Jan. 1, 2015

(30) Foreign Application Priority Data

Nov. 22, 2011    (JP) ................. 2011-255219

(51) Int. Cl.
*H04B 10/032* (2013.01)
*H04Q 11/06* (2006.01)
(Continued)

(52) U.S. Cl.
CPC .......... *H04B 10/032* (2013.01); *H04L 41/0654* (2013.01); *H04Q 11/0067* (2013.01); *H04Q 2011/0081* (2013.01); *H04Q 2011/0083* (2013.01)

(58) Field of Classification Search
None
See application file for complete search history.

(56) References Cited

FOREIGN PATENT DOCUMENTS

| JP | 7-226796 | 8/1995 |
|----|----------|--------|
| JP | 2000-332857 | 11/2000 |

(Continued)

OTHER PUBLICATIONS

International Telecommunication Union, Telecommunication Standardization Sector of ITU G.983.1, Series G: Transmission Systems and Media, Digital Systems and Networks, "Broadband Optical Systems Based on Passive Optical Networks (PON)", Jan. 2005,124 pp.

(Continued)

*Primary Examiner* — Darren E Wolf
(74) *Attorney, Agent, or Firm* — Ohlandt, Greeley, Ruggiero & Perle, L.L.P.

(57) ABSTRACT

A self-diagnostic method for PON protection system, in which optical switch-related failure can be previously inspected, and a PON protection system. A circuit is configured while an optical switch is switched so that signal light from an ONU is input to both a normal system OSU and a redundancy system OSU of an optical access network including the ONU, and there are conducted a circuit configuration test in which the signal light to the normal system OSU and the signal light to the redundancy system OSU are monitored for a predetermined period of time, and when the signal light to one of the OSUs and the signal light to the other do not correspond to each other, it is judged as abnormality and an open state test in which an optical switch is opened so that the signal light from the ONU is input to only the normal system OSU of the optical access network including the ONU, a circuit of the redundancy system OSU and the ONU is brought into an open state, the signal light to redundancy system OSU is monitored for a predetermined time of period, and when the signal light to the redundancy system exists, it is judged as abnormality.

35 Claims, 12 Drawing Sheets

(51) Int. Cl.
  *H04Q 11/00*   (2006.01)
  *H04L 12/24*   (2006.01)

(56) References Cited

FOREIGN PATENT DOCUMENTS

| | | |
|---|---|---|
| JP | 2008-160583 | 7/2008 |
| JP | 2009-171041 | 7/2009 |
| JP | 2010-68362 | 3/2010 |
| JP | 2011-071951 | 4/2011 |
| JP | 2011-124702 | 6/2011 |
| JP | 4911366 B2 | 4/2012 |

OTHER PUBLICATIONS

English translation of International Search Report dated Dec. 11, 2012 corresponding to PCT/JP2012/079666, 2 pp.

SELF-DIAGNOSTIC METHOD FOR PON PROTECTION SYSTEM, AND PON PROTECTION SYSTEM

BACKGROUND

1. Field of the Disclosure

This disclosure relates to a failure detection technique in a communication system.

2. Discussion of the Background Art

A Passive Optical Network (PON) is an optical access network in a point-to-multipoint in which one or more optical subscriber line terminating devices (ONU: Optical Network Units) as user side transmission devices are connected to an optical subscriber line termination board (OSU: Optical Subscriber Unit) as a station-building side transmission device through an optical fiber and a splitter.

In the PON, PON protection is a technique of making an OSU, an ONU, an optical fiber, or a splitter as a constitutive factor of a system redundant and avoiding system down due to OSU failure, ONU failure, optical fiber breakage, and splitter breakage (non-patent document 1, pp. 113-116). Namely, upon applying the PON protection, when those constitutive factors of the system fail or are broken, operation is switched from a normal system to a redundancy system, whereby a service is continued.

To make OSU redundant is particularly considered important in the PON protection. As a first reason, since the OSU is an aggregation point of signals in point-to-multipoint communication, that is, PON, there is such a wide-range property of influence that when the OSU fails, all the subordinated ONUs (users) are affected. As a second reason, since the OSU is constituted of electronic components and software operating them, a possibility of a failure is highly likely to occur in comparison with an optical fiber/splitter as a mere optical waveguide. Accordingly, usually the OSU should be first made redundant in the PON protection.

One to a plurality of OSUs, an exchange switch (connected to the high-order side of the one to a plurality of OSUs), a high-order network interface (connected to the high-order side of the exchange switch), and an OLT controller controlling them are usually collectively stored in an optical subscriber line terminal station device (OLT: Optical Line Terminal). Namely, the OLT is a communication node exchanging the high-order network with PON, and a large number of OSUs which become interfaces on the PON side may be required. Accordingly, when the OSU is made redundant, an optimum constitution is required to be considered based on such a basic constitution of the OLT (in each drawing, the exchange switch, the high-order network interface, and input and output lines associated with them are omitted in terms of avoiding complexity).

In a first constitution in a conventional OSU redundant technique, as shown in FIG. 1, a redundancy system OSU 12 is provided for each normal system OSU 11 in an OLT 10 (Type-B of non-patent documents 1, p. 114). For convenience, the first constitution is referred to as a "redundancy system OSU independent type". Specific configuration and operation of the "redundancy system OSU independent type" are as follows. A normal system OSU 11-1 and a redundancy system OSU 12-1 are connected to an ONU 51 (the number of the ONUs is an integer not less than 0, and ports on the ONU side of a splitter may include a free port) through an N:2 splitter 41-1 (N is an integer of not less than 1) (a splitter is further installed farther away than the N:2 splitter, and further branching may be performed). The normal system OSU 11-1 transfers a signal from the lower ONU 51 to the upper exchange switch and transfers a signal from the upper exchange switch to the lower ONU 51 respectively. When the normal system OSU 11-1 fails during communication, an OLT controller 15 having detected the failure performs switching, (i) the normal system OSU 11-1 is stopped,
   (ii) the redundancy system OSU 12-1 is started, and
   (iii) setting of the exchange switch is changed.

Then, the redundancy system OSU 12-1 starts to transfer the signal from the lower ONU 51 to the upper exchange switch and transfer the signal from the upper exchange switch to the lower ONU 51 similarly to before the occurrence of the failure and thereby continues a service.

A connection form between a normal system OSU 11-*i* and a redundancy system OSU 12-*i* (i=2, 3, . . . ) and the operation at the time of protection are the same as those in the relation between the OSU 11-1 and the OSU 12-1.

In the constitution of the "redundancy system OSU independent type", since the same number of the redundancy system OSUs and the normal system OSUs are required to be previously stored in the OLT, there are problems of OLT slot consumption and an increase in OSU introduction cost.

Meanwhile, in a second constitution of the conventional OSU redundant technique, as shown in FIG. 2, the redundancy system OSU 12 is provided in the OLT 10 with respect to a plurality of the normal system OSUs 11, whereby the problems of the OLT slot consumption and the increase in cost are suppressed (FIG. 2: FIG. 1 of patent document 1 and FIG. 1 of patent document 2). For convenience, the second constitution is referred to as a "redundancy system OSU sharing type". Specific configuration and operation of the "redundancy system OSU sharing type" are as follows.

The OLT 10 stores a normal system OSU 11-*i* (i=1, 2, 3, . . . , and M, M is an integer of not less than 1) and a redundancy system OSU 12-*x*. Input and output ports on the ONU side of the redundancy system OSU 12-*x* is connected to an input and output port (referred to as a port x) of an M:1 optical switch 32. The M input and output ports (referred to as ports 1, 2, 3, . . . , and M) on the ONU side of the M:1 optical switch 32 are paired as the port 1 and the OSU 11-1, the port 2 and the OSU 11-2, the port 3 and the OSU 11-3, . . . , and the port M and the OSU 11-M, and these pairs are connected to N or less ONUs 50 through N:2 splitters 41-*i* (i=1, 2, 3, . . . , and M) (N ports on the ONU side of the splitter may include a free port).

The normal systems OSU 11 each transfer a signal from the lower ONU 50 to the upper exchange switch and transfer a signal from the upper exchange switch to the lower ONU 50. When the normal system OSU 11-1 fails during communication, the OLT controller 15 having detected the failure performs switching, (i) the normal system OSU 1 is stopped,
   (ii) the port x and the port 1 are connected in the optical switch 32,
   (iii) a redundancy system OSUx is started, and
   (iv) setting of the exchange switch is changed.

Then, the redundancy system OSU 12-*x* starts to transfer the signal from the lower ONU 50 to the upper exchange switch and transfer the signal from the upper exchange switch to the lower ONU 50 respectively similarly to before the occurrence of the failure and thereby continues a service.

It is the same as the above description that the operation of the failure of other normal system OSUs 11-*i* (i=2, 3, and . . . ), except that the normal system OSU 11, the splitter 41, and the port of the optical switch 32 are exchanged.

In this description (FIG. 2), the optical switch 32 is controlled by the optical switch controller 31, and moreover, the OLT controller 15 controls the optical switch controller 31. However, the optical switch controller 31 may not be provided, and the optical switch 32 may be controlled directly by the OLT controller 15.

In the constitution of the "redundancy system OSU sharing type", since only the single redundancy system OSU 12 stored in the OLT 10 may be provided with respect to the M normal system OSUs 11, the problems of the OLT slot consumption and the increase in the OSU introduction cost have been solved. Further, under the condition that there is a sufficiently low probability that a plurality of the normal system OSUs fail simultaneously, it is easy to secure reliability by making the OSU redundant in this constitution and operation.

In the OLT, although the exchange switch, the high-order network interface, and the OLT controller may be made redundant, this case is not directly related in the disclosure, and therefore, description thereof will be omitted.

CITATION LIST

Non-Patent Literature

Non-Patent Literature 1: ITU-T G.983.1

Patent Literature

Patent Literature 1: JP 7-226796 A
Patent Literature 2: JP 2000-332857 A

As described above, in the "redundancy system OSU sharing type" of PON protection configuration in the conventional OSU redundant technique, in comparison with the "redundancy system OSU independent type" of PON protection configuration, only a small number of the redundancy system OSUs is required, and therefore, the problems of the OLT slot consumption and the increase in the OSU introduction cost have been solved.

While, note the optical switch 32 introduced in the configuration of the "redundancy system OSU sharing type". Only one optical switch 32 is installed between the redundancy system OSU 12-$x$ and the N:2 splitter 41-$i$ (i= 1, 2, 3, . . . , and M), and the optical switch 32 itself does not have a redundancy configuration. Although an MEMS optical switch and a mechanical optical switch are assumed as the optical switch 32, these devices are mechanically operated, and therefore, the optical switch 32 has a higher possibility of deterioration and failure than OSU (constituted of electronic components). However, in the configuration of the "redundancy system OSU sharing type", the optical switch does not have the redundant configuration, and thus the reliability of the PON protection is required to be improved.

More specifically, a scenario of failures in the PON protection due to the optical switch (such a failure disabling the continuance of a service) will be described below. In the "redundancy system OSU sharing type" of PON protection configuration, it is assumed that the normal system OSU 11-1 has failed. At this time, the operation of switching to the redundancy system OSU should be performed along the above (i) to (iv). However, if the failure rate of the optical switch 32 is higher than that of the OSU as described above, since the optical switch 32 has failed in many cases, "(ii) connection of the port x and the port 1 in the optical switch 32" may not be able to be performed. In this case, the PON protection cannot be executed due to the optical switch failure, so that a service cannot be continued.

As described above, although the "redundancy system OSU sharing type" of PON protection configuration is attractive in terms of the OLT slot reduction and the OSU introduction cost reduction, there is a problem in that the PON protection is not perfect in terms of the reliability of the optical switch.

Meanwhile, although a method of making the optical switch redundant may be considered, new problems of introduction cost of the second optical switch and complication of optical wiring occur.

Although a method of improvement of the reliability of the optical switch itself may be considered, in order to make a mean time between failures (MTBF) of the entire system similar to the "redundancy system OSU sharing type of" PON protection configuration, the optical switch failure rate is required to be lowered to an extent of an optical fiber or a splitter. It is difficult to realize the optical switch having such a high reliability at the current moment.

As described above, although the optical switch controller may be provided for controlling the optical switch, the failure of the optical switch controller causes the failure of the PON protection as well as the failure of the optical switch.

As described above, it is difficult to improve optical switch-related reliability. In view of this fact, if it is possible to previously know optical switch-related failure and perform optical switch-related exchange or repair before the failure of OSU, impossibility of continuation of a service can be avoided, and the reliability of the PON protection can be improved.

SUMMARY

Thus, in order to enhance the reliability of the PON protection, an object of the present disclosure is to provide a self-diagnostic method for PON protection system, in which optical switch-related failure can be previously inspected, and a PON protection system.

Solution to Problem

In order to achieve an object, in this disclosure, the optical switch-related failure is judged by comparing signal light to a normal system OSU with signal light to a redundancy system OSU.

More specifically, in a self-diagnostic method for a first PON protection system according to the present disclosure, a Passive Optical Network (PON) including a plurality of optical access networks connecting a normal system optical subscriber line termination board (OSU: Optical Subscriber Unit) as station-building side transmission devices to one or more optical subscriber line terminating devices (ONU: Optical Network Units) as user side transmission devices in the point-to-multipoint is provided with a redundancy system OSU which can communicate with the ONUs administered by the OSU as a substitute for any of the OSUs by switching an optical switch, when the redundancy system OSU is in a standby state, a circuit is configured while the optical switch is switched so that signal light from the ONU is input to both the normal system OSU and the redundancy system OSU of the optical access network including the ONU, and such a circuit configuration test is conducted that the signal light to the normal system OSU and the signal light to the redundancy system OSU are monitored for a predetermined period of time, and when the signal light to one of the OSUs and the signal light to the other do not correspond to each other, it is judged as abnormality.

In the circuit configuration test, an arbitrary path of the normal system OSU is selected from the ONUs during communication, and the optical switch is switched so that a redundancy system OSU is further connected to the path concerned. With such a circuit configuration, when the optical switch does not fail, the signal light from the ONU is input to not only the path of the normal system OSU but also the path of the redundancy system OSU. Namely, the signal light of the path of the normal system OSU and the signal light of the path of the redundancy system OSU are compared with each other, and when the signal lights are the same as each other, it can be judged that the optical switch is normal; meanwhile, when the signal lights do not correspond to each other, and, for example, when there is signal light in one OSU and there is no signal light in the other, it can be judged that the optical switch fails. The circuit configuration test can be conducted during normal communication.

Accordingly, the present disclosure can provide a self-diagnostic method for PON protection system in which optical switch-related failure can be previously inspected.

In the self-diagnostic method for PON protection system according to the present disclosure, the circuit configuration test is repeated a plurality of times. The circuit configuration test is repeated a plurality of times at an arbitrary time, whereby failure with no reproducibility can be detected.

In the self-diagnostic method for PON protection system according to the present disclosure, in the circuit configuration test, the signal light is monitored in the normal system OSU and the redundancy system OSU for a predetermined time of period.

In the self-diagnostic method for PON protection system according to the present disclosure, in the circuit configuration test, light to the normal system OSU and the signal light to the redundancy system OSU are monitored by optical power measurement for a predetermined time of period.

More specifically, in a self-diagnostic method for a second PON protection system according to the present disclosure, a Passive Optical Network (PON) including a plurality of optical access networks connecting a normal system optical subscriber line termination board (OSU: Optical Subscriber Unit) as a station-building side transmission device to one or more optical subscriber line terminating devices (ONU: Optical Network Units) as user side transmission devices in the point-to-multipoint is provided with a redundancy system OSU which can communicate with the ONUs administered by the OSU as a substitute for any of the OSUs by switching an optical switch, such an open state test is conducted that when the redundancy system OSU is in a standby state, the optical switch is opened so that signal light from the ONU is input only to the normal system OSU of the optical access network including the ONU, circuits of the redundancy system OSU and the ONU are opened, the signal light to the redundancy system OSU is monitored for a predetermined time of period, and when the signal light to the redundancy system OSU exists, it is judged as abnormality.

In the open state test, the signal light of the path of the normal system OSU and the signal light of the path of the redundancy system OSU are compared in such a state that the optical switch is not connected to any path from the ONU during communication to the normal system OSU. Since the optical switch blocks the path to the redundancy system OSU, when there is no signal light in the path concerned, it can be judged that the optical switch is normal, and when there is the signal light in the path, it can be judged that the optical switch fails. The circuit configuration test can be conducted during normal communication.

Accordingly, the present disclosure can provide a self-diagnostic method for PON protection system in which optical switch-related failure can be previously inspected.

In the self-diagnostic method for PON protection system according to the present disclosure, the open state test is repeated a plurality of times. The open state test is repeated a plurality of times at an arbitrary time, whereby failure with no reproducibility can be detected.

In the self-diagnostic method for PON protection system according to the present disclosure, in the open state test, the signal light is monitored in the redundancy system OSU for a predetermined time of period.

In the self-diagnostic method for PON protection system according to the present disclosure, in the open state test, the signal light to the redundancy system OSU is monitored by optical power measurement for a predetermined time of period.

More specifically, in a self-diagnostic method for a third PON protection system according to the present disclosure, a Passive Optical Network (PON) including a plurality of optical access networks connecting a normal system optical subscriber line termination board (OSU: Optical Subscriber Unit) as a station-building side transmission device to one or more optical subscriber line terminating devices (ONU: Optical Network Units) as user side transmission devices in the point-to-multipoint is provided with a redundancy system OSU which can communicate with the ONUs administered by the OSU as a substitute for any of the OSUs by switching an optical switch, when the redundancy system OSU is in the standby state, a circuit is configured while the optical switch is switched so that signal light from the ONU is input to both the normal system OSU and the redundancy system OSU of the optical access network including the ONU, a no-signal period during which transmission of the signal light to all registered ONUs is stopped is formed, and such a no-signal state test is conducted that light to the normal system OSU and light to the redundancy system OSU are monitored for the no-signal period, and when the light to one of the OSUs and the light to the other do not correspond to each other, it is judged as abnormality.

In the no-signal state test, at first, at each ONU, the transmission of the signal light to the OSU is stopped, and the no-signal period is generated. Then, an arbitrary path of the normal system OSU is selected from the ONU, and the optical switch is switched so that a redundancy system OSU is further connected to the path concerned. With such a circuit configuration, when the optical switch and an optical transmission path do not fail, light is not input to the normal system OSU and the redundancy system OSU. Although the ONU is sometimes required to transmit management signal light used for system management even during the no-signal period, if the optical switch and the optical transmission path do not fail, the management signal light is input to the normal system OSU and the redundancy system OSU. Namely, the light of the path of the normal system OSU and the light of the path of the redundancy system OSU are compared with each other, and when the lights are the same as each other, it can be judged that the optical switch and the optical transmission path are normal; meanwhile, when the lights do not correspond to each other, and, for example, when there is light in one OSU and there is no light in the other, it can be judged that the optical switch and the optical transmission path fail.

Accordingly, the present disclosure can provide a self-diagnostic method for PON protection system in which optical switch-related failure can be previously inspected.

In the self-diagnostic method for PON protection system according to the present disclosure, the no-signal state test is repeated a plurality of times. The no-signal state test is repeated a plurality of times, whereby failure with no reproducibility can be detected.

In the self-diagnostic method for PON protection system according to the present disclosure, the no-signal period may be discovery window.

In the self-diagnostic method for PON protection system according to the present disclosure, in the no-signal state test, a light detection signal output from the OSU within a certain period may be used after input of light.

In that case, when a time at which the normal system OSU outputs the light detection signal is represented as $T_1$, a time at which the redundancy system OSU outputs the light detection signal is represented as $T_2$, and the time of the no-signal period is represented as $T_D$, it is set that $T_1 \leq T_2 \leq T_D/2$.

In the self-diagnostic method for PON protection system according to the present disclosure, in the no-signal state test, the light to the normal system OSU and the light to the redundancy system OSU are monitored by optical power measurement.

A first PON protection system according to the present disclosure has a control circuit so that the circuit configuration test and the open state test as described above can be conducted. More specifically, the present disclosure provides a PON protection system provided with an optical switch, which selectively connects a redundancy system OSU which can communicate with the ONU stored in the OSU as a substitute for any of the OSUs, the redundancy system OSU, and any of the optical access networks to a Passive Optical Network (PON) including a plurality of optical access networks connecting a normal system optical subscriber line termination board (OSU: Optical Subscriber Unit) as a station-building side transmission device to one or more optical subscriber line terminating devices (ONU: Optical Network Units) as user side transmission devices in the point-to-multipoint, and a control circuit which performs a self-diagnostic method by switching the optical switch and by using the OSU.

The present disclosure can provide a PON protection system which can previously inspect optical switch-related failure by conducting the circuit configuration test and the open state test with the use of the normal system OSU and the redundancy system OSU based on an instruction from the control circuit.

A second PON protection system according to the present disclosure has a control circuit and optical power measuring means so that the circuit configuration test and the open state test can be conducted. More specifically, the present disclosure provides a PON protection system provided with an optical switch, which selectively connects a redundancy system OSU which can communicate with the ONU stored in the OSU as a substitute for any of the OSUs, the redundancy system OSU, and any of the optical access networks to a Passive Optical Network (PON) including a plurality of optical access networks connecting a normal system optical subscriber line termination board (OSU: Optical Subscriber Unit) as a station-building side transmission device to one or more optical subscriber line terminating devices (ONU: Optical Network Units) as user side transmission devices in the point-to-multipoint, optical power measuring means that measures the signal light to the normal system OSU and the signal light to the redundancy system OSU with optical power, and a control circuit which performs a self-diagnostic method by switching the optical switch and by using the optical power measuring means.

The present disclosure can provide a PON protection system which can previously inspect optical switch-related failure by conducting the circuit configuration test and the open state test with the use of the optical power measuring means based on an instruction from the control circuit.

Advantageous Effects of Disclosure

Accordingly, the present disclosure can provide a self-diagnostic method for PON protection system, in which optical switch-related failure can be previously inspected, and a PON protection system.

DETAILED DESCRIPTION OF THE PREFERRED EMBODIMENT

Figure 1:
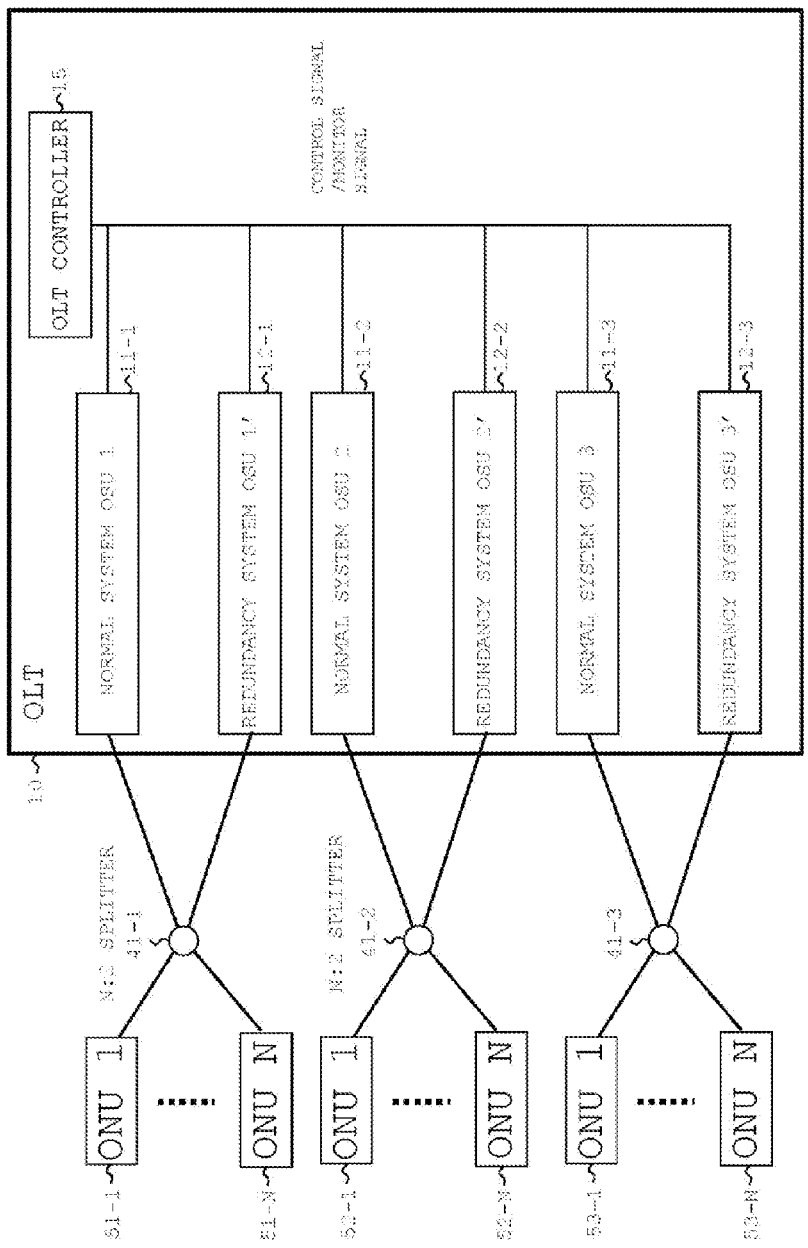
FIG. 1 is a view showing a configuration of conventional PON protection (redundancy system OSU independent type)

Embodiments of the present disclosure will be described with reference to the accompanying drawings. The embodiments to be described hereinafter are examples of the present disclosure, and the disclosure is not limited to the following embodiments. Components denoted by the same reference numerals in the present specification and the drawings mutually denote the same components. Further, description without branch number is common to all branch numbers of a reference numeral concerned.

Embodiment 1

Figure 3:
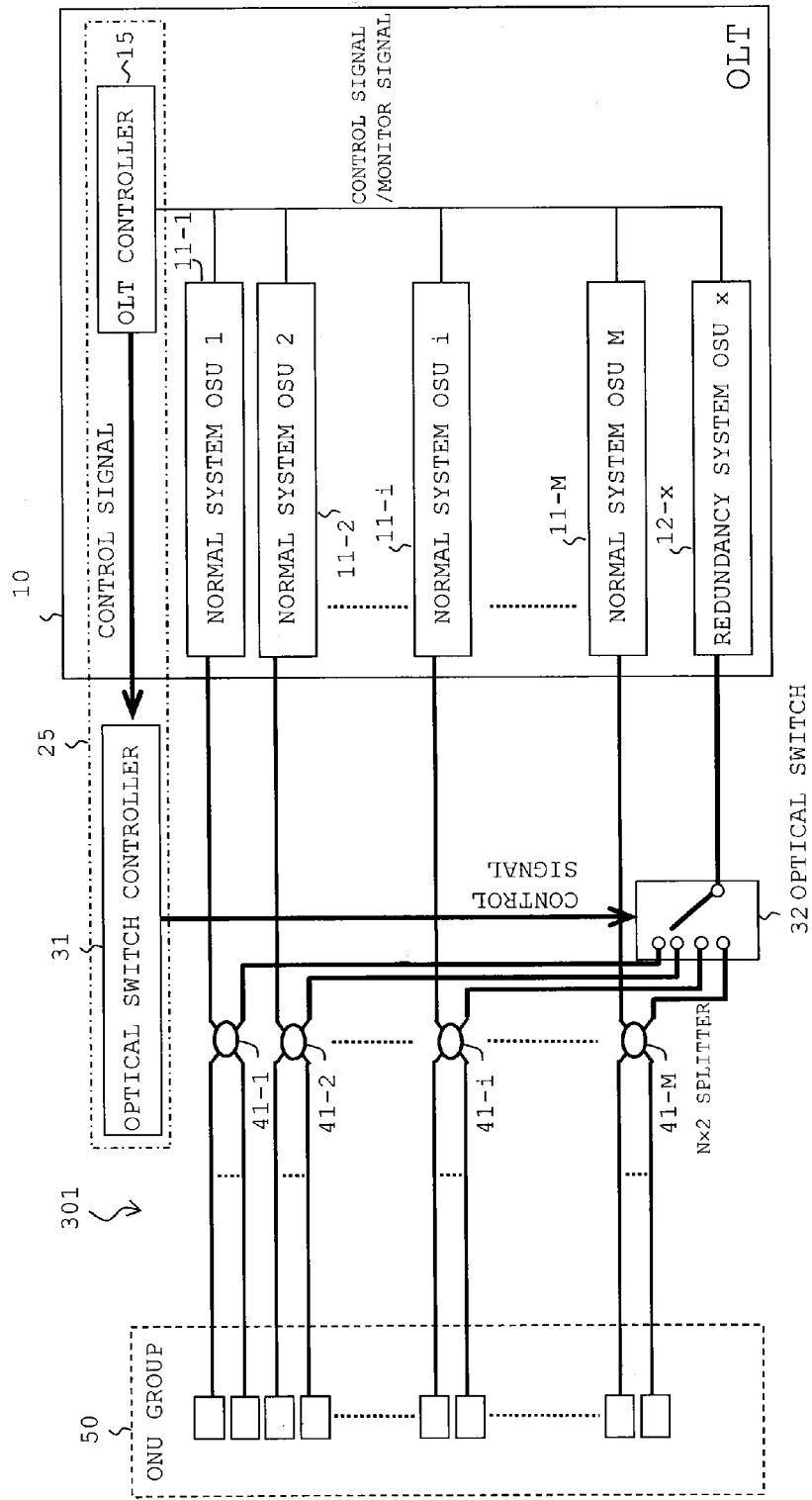
FIG. 3 is a view showing a configuration of PON protection according to the present disclosure.

FIG. 3 is a view for explaining a configuration of a PON protection system 301 of this embodiment. In the PON protection system 301, a PON including a plurality of optical access networks connecting a normal system OSU 11 as a station-building side transmission device and one or more ONUs 50 as user side transmission devices in a point-to-multipoint is provided with a redundancy system OSU 12 which can communicate with the ONU 50 stored in an OSU 11 as a substitute for any of the OSUs 11, an optical switch 32 selectively connecting the redundancy system OSU 12 and any of optical access networks, and a control circuit 25 which switches the optical switch 32 and performs a self-diagnostic method.

Figure 2:
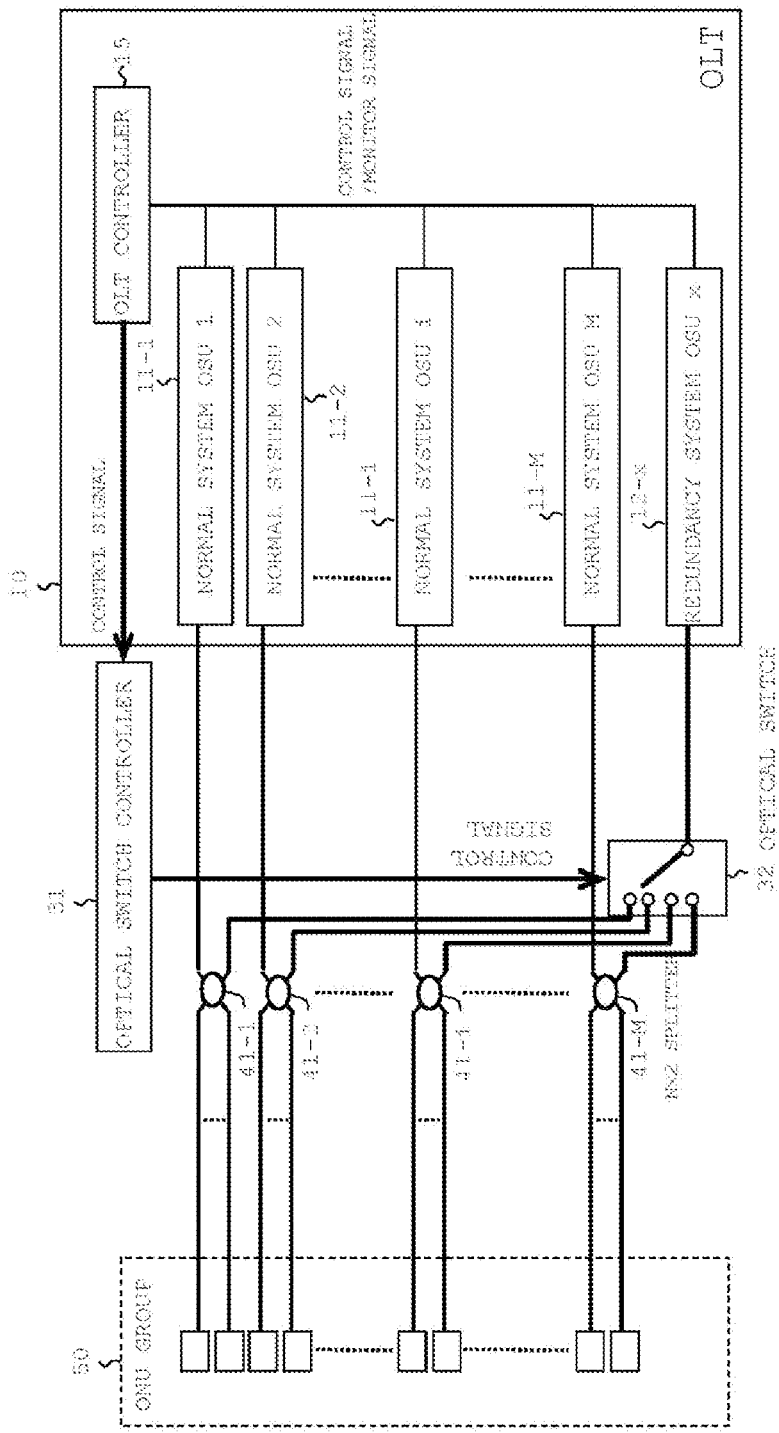
FIG. 2 is a view showing a configuration of conventional PON protection (redundancy system OSU sharing type)

The PON protection system 301 is configured that a configuration for optical switch self-diagnosis is added to a "redundancy system OSU sharing type" of PON protection configuration in FIG. 2. In the configuration of the PON protection system 301, since the basic configuration and the configuration at the time of PON protection are the same as the "redundancy system OSU sharing type" of PON protection configuration in FIG. 2, description related thereto will be omitted.

Hereinafter, the optical switch controller 31 and the OLT controller 15 will be described and explained as independent functional blocks; however, when the OLT controller 15 has the functions of the optical switch controller 31, there is no problem even by using a design method without providing an independent optical switch controller.

Hereinafter, features of uplink signal light in the PON (a signal transmitted from the ONU 50 to the OSU 11) and a self-diagnostic function of the optical switch 32 using this feature will be described.

Since it is premised that in the PON a plurality of the ONUs 50 and an OSU 11 are communicated with each other in the point-to-multipoint, each of the ONUs 50 transmits the uplink signal light in a burst manner to prevent collision of signal light of an uplink line. Namely, the uplink signal light in the PON is not a continuous signal originally but a burst signal.

A power source of each of the ONUs 50 is usually under a control of a user, and an uplink signal light transmission state of the ONU 50 is controlled by the state of the power source. Thus, in all the ONUs 50 subordinate to the OSU 11, in a case where the power source is turned off by a user, when the traffic is small and the ONU 50 is in a power-saving mode, or when a section to which the ONU 50 belongs is blown out, it may become the condition that all the ONUs 50 subordinate to the OSU 11 simultaneously does not transmit the uplink signal light for a long time. Namely, the uplink signal light in the PON is not stable as a light source for test because it is not in a continuous lighting state in terms of a short time span or a long time span.

However, the uplink signal light of the PON is the only light input to the optical switch 32 at the time of non-protection of the PON (at the time of a normal operation, and the redundancy system OSU 12 is in the standby state). Accordingly, in this embodiment the uplink signal light of the PON is used in test light in the self-diagnosis of the optical switch 32.

Figure 4:
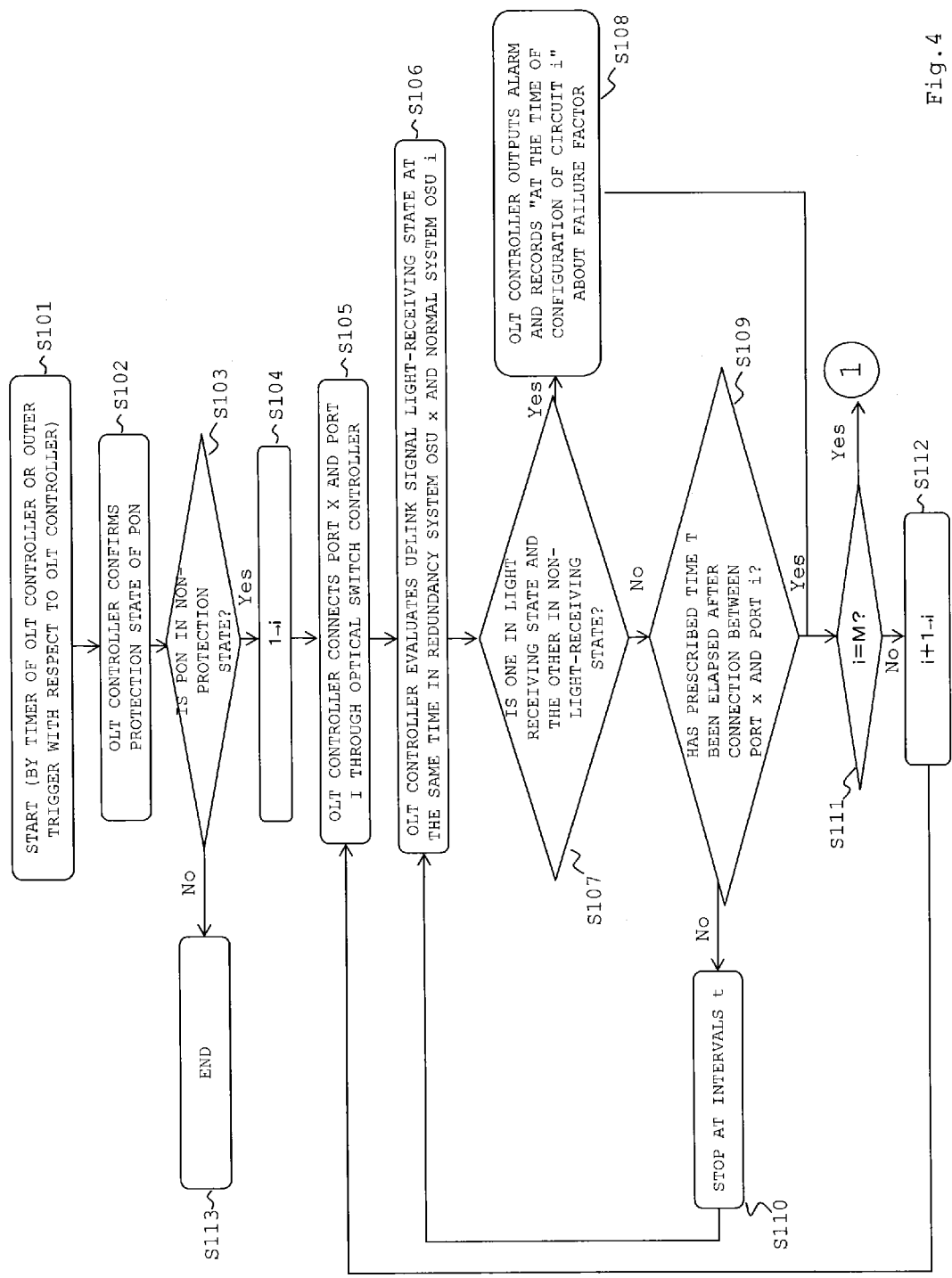
FIG. 4 is a view showing a flow chart of PON protection according to the present disclosure.
Figure 5:
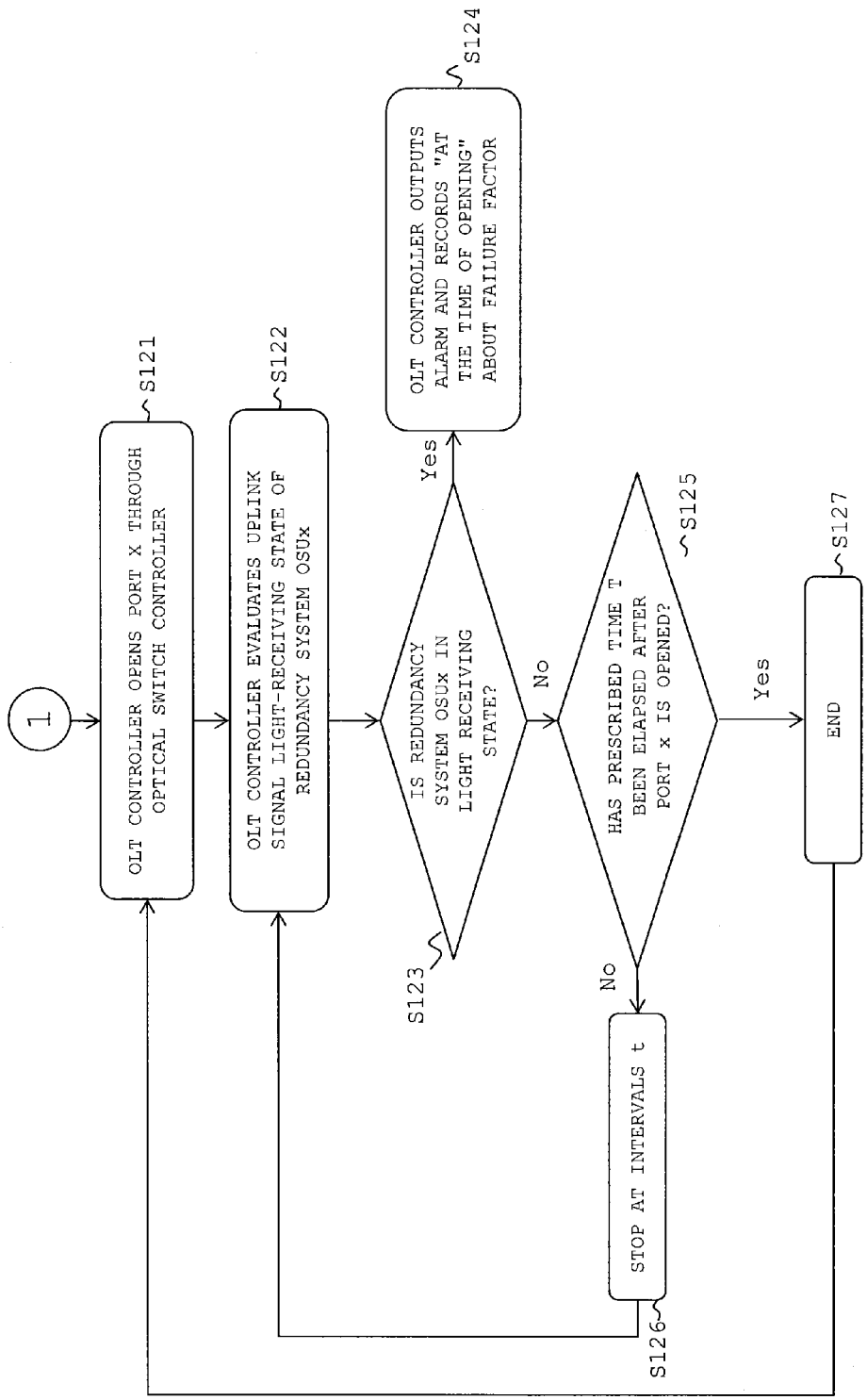
FIG. 5 is a view showing a flow chart of the PON protection according to the present disclosure.
Figure 9:
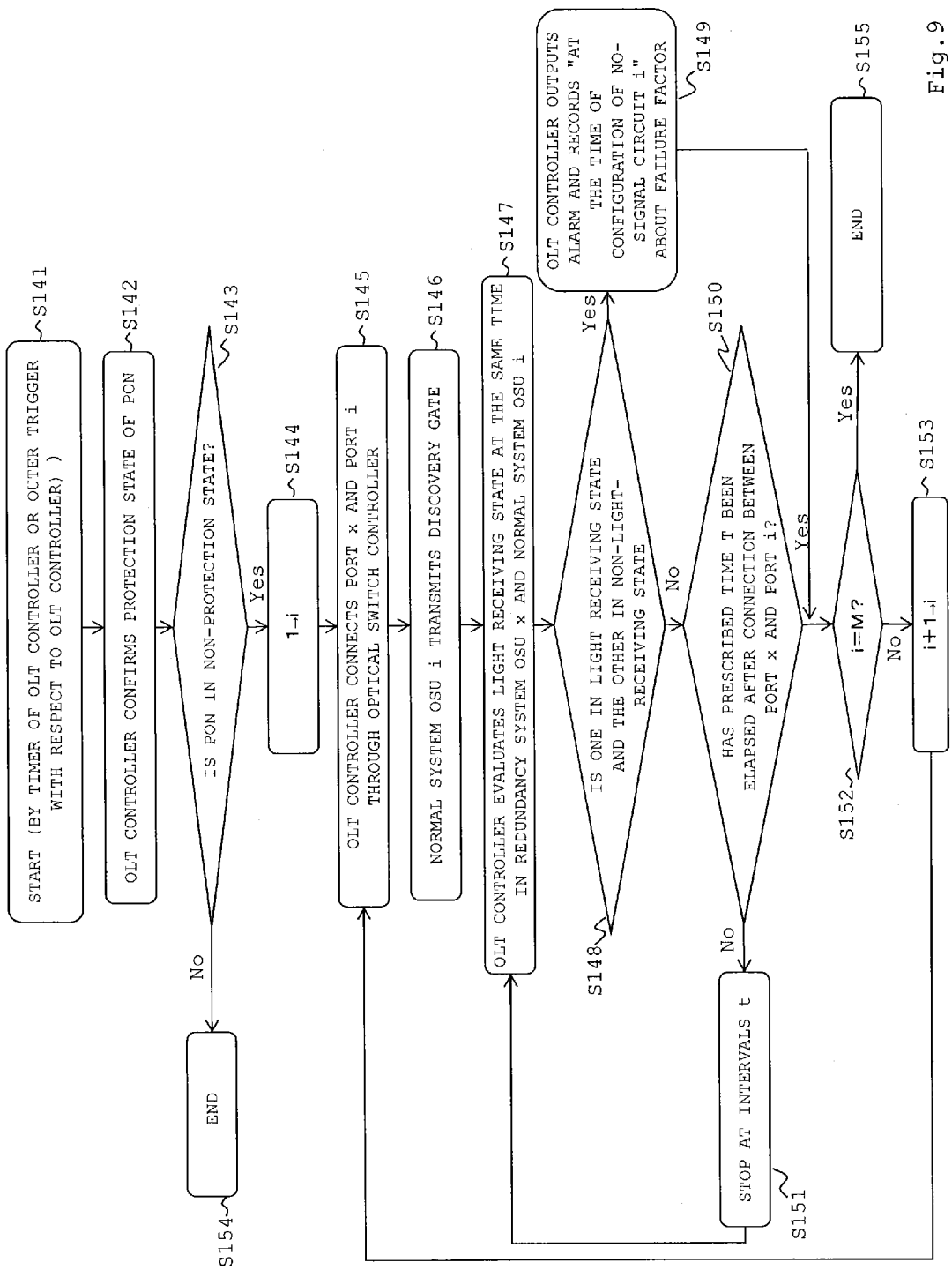
FIG. 9 is a view showing a flow chart of the PON protection according to the present disclosure.

The operation for the self-diagnosis is as follows. FIGS. 4, 5, and 9 show flow charts. In the self-diagnosis, it is premised that the PON is in the non-protection state. Namely, the control circuit 25 including the OLT controller 15 and the optical switch controller 31 configures a circuit while switching the optical switch 32 so that when the redundancy system OSU 12-*x* is in the standby state, the signal light from the ONU 50 is input to both the normal system OSU 11-*i* and the redundancy system OSU 12-*x* of the optical access network including the ONU and conducts such a circuit configuration test that the signal light to the normal system OSU 11-*i* and the signal light to the redundancy system OSU 12-*x* are monitored for a predetermined time of period, and when the signal light to one of the OSUs and the signal light to the other do not correspond to each other, it is judged as abnormality.

[Start]

The self-diagnosis is actuated by a timer in the OLT controller 15 or input of a trigger from outside to the OLT controller 15 (step S101). First, the OLT controller 15 confirms that the PON is in the non-protection state (steps S102 and S103). Since the instruction of protection is issued from the OLT controller 15 to each section, the protection/non-protection state can be confirmed by referring to a memory in the OLT controller 15 (in addition to this, the confirmation can be performed by referring to a memory in the normal system OSU 11-*i*, the redundancy system OSU 12-*x*, or the optical switch controller 31). When the PON is not in the non-protection state, the self-diagnosis is not performed (step S113). When the PON is in the non-protection state, the flow proceeds to the next [port test].

[Port Test]

In the optical switch 32, there are M combinations constituting a circuit while the port x on the redundancy system OSU 12 side is connected to the port (port i) on the ONU 50 side, and therefore, M types of "circuit configuration tests" are conducted. Since there is a release state (in which the port x on the redundancy system OSU 12 side is not connected to any other ports i), one time open state test is conducted. Those test methods will be described. The order of the operations in those tests is arbitrary.

(1) Circuit Configuration Test (Steps S104 to S112)

The OLT controller 15 makes the optical switch 32 configure a circuit connecting the port x and the port i through the optical switch controller 31 (step S105). Next, the OLT controller 15 evaluates a light receiving state of the uplink signal light at the same time in the redundancy system OSU 12-*x* and the normal system OSU 11-*i* (step S106). At this time, although the uplink signal light is not a stable light source, if the optical switch 32, the optical switch controller 31, the redundancy system OSU 12-*x*, and the normal system OSU 11-*i* are normally operated, the redundancy system OSU 12-*x* and the normal system OSU 11-*i* simultaneously receive light. Accordingly, when any one of the following states is detected:

(a) a state in which the redundancy system OSU 12-*x* does not receive light, and the normal system OSU 11-*i* receives light; and (b) a state in which the redundancy system OSU 12-*x* receives light, and the normal system OSU 11-*i* does not receive light, it can be determined that any of the optical switch 32, the optical switch controller 31, and the redundancy system OSU 12-*x* fails (steps S107 and S108). The light reception/non-light reception of the redundancy system OSU 12-*x* and the normal system OSU 11-*i* may be determined from the fact that the uplink signal light of an electric power of not less than a threshold value is received or not received during measurement. Alternatively, the light reception/non-light reception of the redundancy system OSU 12-*x* and the normal system OSU 11-*i* may be determined from the fact that uplink data of the amount of information (such as bit number, frame number, packet number, and cell number) of not less than a threshold value or of a prescribed value is received or not received during measurement (in this case, if such a setting is performed that the information amount (such as bit number, frame number, packet number, and cell number) with a prescribed number is output from a specified OSU by, for example, loop test setting, whereby the information amount of the uplink signal can be controlled. In this case, whether the information is the information transmitted from the corresponding ONU can be discriminated by an identifier such as an LLID. As described above, means that controls uplink signal transmission information amount of a specified ONU from the OSU side includes a loop test and an OAM, and the LLID and an SA exist as identifiers to determine whether the information is transmitted from the corresponding ONU).

(a) or (b) may occur due to a failure of the normal system OSU 11-*i*. However, regarding the failure of the normal system OSU 11-*i*, the failure of the normal system OSU 11-*i* is detected based on the fact that a main signal cannot be communicated, and the PON protection is already started. Accordingly, description of the failure of the normal system OSU 11-*i* will be omitted.

When (a) or (b) occurs, the OLT controller 15 records "at the time of configuration of circuit i" about the failure factor to output an alarm and, thus, to terminate the circuit configuration test with respect to the port i (step S108). This alarm may be any of superimposition to an OAM (Operation Administration and Maintenance) signal, output to LED, output to a dedicated output terminal, and accumulation to a log.

Meanwhile, the above state evaluation is repeated within a prescribed time T at specified intervals t (t≤T) or a prescribed number of times, and if the phenomenon (a) or (b) does not occur during the prescribed time T, the OLT controller 15 determines that the failure of the optical switch 32, the optical switch controller 31, or the redundancy system OSU 12-*x* is not detected and terminates the circuit configuration test with respect to the port i (steps S109 and S110).

The above is a flow of the circuit configuration test with respect to a specified port i. A similar circuit configuration test is conducted with respect to other ports (steps S111 and S112). In the circuit configuration test, i may be monotonically increased from 1 to M or monotonically reduced from M to 1 and may be changed arbitrarily. Although FIG. 4 is a flow in which i is monotonically increased from 1 to M, this disclosure is not limited thereto.

(2) Open State Test

The control circuit 25 conducts such a circuit configuration test that the optical switch 32 is opened so that when the redundancy system OSU 12-*x* is in the standby state, the signal light from the ONU 50 is input to only the normal system OSU 11-*i* of the optical access network including the ONU, a circuit of the redundancy system OSU 12-*x* and the ONU 50 is brought into an open state, the signal light to the redundancy system OSU 12-*x* is monitored for a predetermined time of period, and when the signal light to the redundancy system OSU 12-*x* exists, it is judged as abnormality.

The OLT controller 15 makes the optical switch 32 configure a circuit through the optical switch controller 31 so that the port x is in the open state (a state in which the port x is not connected to any other ports i) (step S121). Next, the OLT controller 15 evaluates a light receiving state of the uplink signal light in the redundancy system OSU 12-*x* (step S122). At this time, although the uplink signal light is not a stable light source, if the optical switch 32, the optical switch controller 31, and the redundancy system OSU 12-*x* are normally operated, the redundancy system OSU 12-*x* does not receive light. Accordingly, when the following state is detected:

(c) a state in which the redundancy system OSU 12-*x* receives light, it can be determined that any of the optical switch 32, the optical switch controller 31, and the redundancy system OSU 12-*x* fails (steps S123). The light reception/non-light reception of the redundancy system OSU 12-*x* may be determined from the fact that the uplink signal light of an electric power of not less than a threshold value is received or not received during measurement. Alternatively, the light reception/non-light reception of the redundancy system OSU 12-*x* may be determined from the fact that the uplink data of the information amount (such as bit number, frame number, packet number, and cell number) of not less than a threshold value or of a prescribed value is received or not received during measurement (in this case, if such a setting is performed that the information amount (such as bit number, frame number, packet number, and cell number) of a prescribed number is output from a specified OSU by, for example, loop test setting, whereby the information amount of the uplink signal can be controlled. In this case, whether the information is the information transmitted from the corresponding ONU can be discriminated by an identifier such as an LLID. As described above, means that controls uplink signal transmission information amount of a specified ONU from the OSU side includes a loop test and an OAM, and the LLID and an SA exist as identifiers to determine whether the information is transmitted from the corresponding ONU).

When (c) occurs, the OLT controller 15 records "at the time of opening" about the failure factor to output an alarm and, thus, to terminate the open state test (step S124). This alarm may be any of superimposition to an OAM signal, output to LED, and output to a dedicated output terminal.

Meanwhile, the above state evaluation is repeated within a prescribed time T at specified intervals t (t≤T) or a prescribed number of times, and if the phenomenon (c) does not occur during the prescribed time T, it is determined that the failure of the optical switch 32, the optical switch controller 31, or the redundancy system OSU 12-*x* is not detected, and the open state test is terminated (steps S125, S126 and S127).

Since there is such an optical switch that the port x cannot be set to the open state, the open state test may be not conducted. The open state test may be conducted before or after the circuit configuration test or between the circuit configuration tests. Although FIGS. 4 and 5 are flows in which the open state test is conducted after the circuit configuration test, this disclosure is not limited thereto.

[Termination]

The OLT controller 15 terminates the "circuit configuration test" for the M ports and the one time open state test and thereafter terminates the self-diagnostic operation. When the PON protection is required to be performed during the self-diagnostic operation, the self-diagnostic operation is terminated.

(3) No-Signal State Test

The control circuit 25 configures a circuit while switching the optical switch 32 so that when the redundancy system OSU 12-*x* is in a standby state, the signal light from the ONU 50 is input to both the normal system OSU 11-*i* and the redundancy system OSU 12-*x* of the optical access network including the ONU, forms a no-signal period during which transmission of the signal light to all registered ONUs 50 is stopped, and conducts such a no-signal test that light to the normal system OSU 11-*i* and light to the redundancy system OSU 12-*x* are monitored for the no-signal period, and when the light to one of the OSUs and the light to the other do not correspond to each other, it is judged as abnormality.

Figure 10:
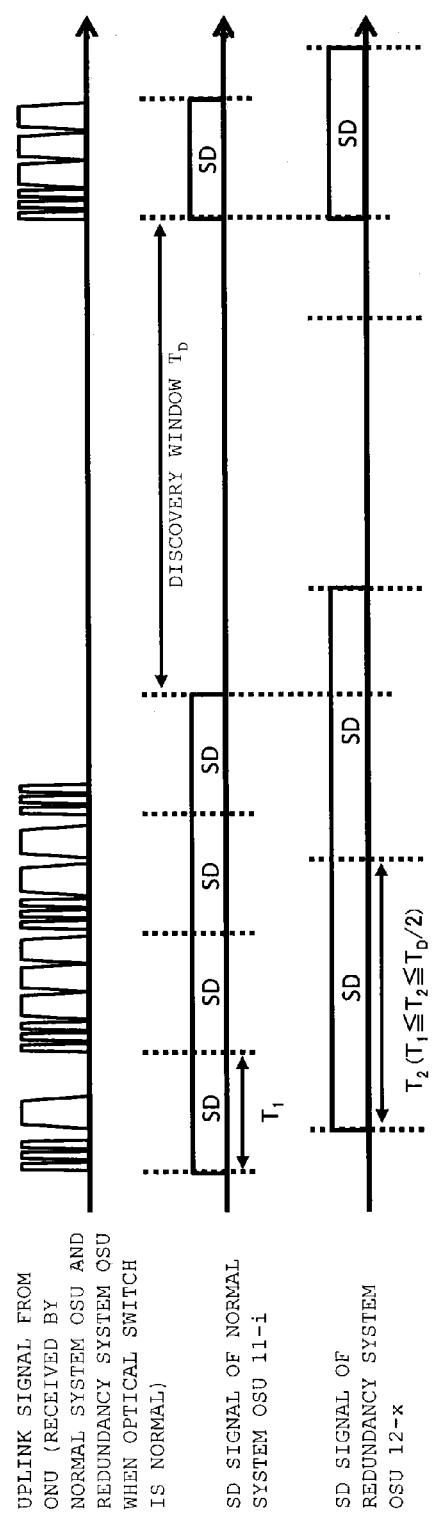
FIG. 10 is a view for explaining discovery window.

The no-signal period can be realized by using discovery window. FIG. 10 shows the discovery window in the OSU. The discovery window is a period during which a newly connected unregistered ONU is registered in the OSU and is started by transmitting a gate signal for discovery from the OSU to registered and unregistered ONUs subordinate to the OSU. The unregistered ONU having received the gate signal transmits a registration request to the OSU within a prescribed time. Meanwhile, the registered OSU having received the gate signal stops transmission of the uplink signal for a prescribed time.

[Start]

The self-diagnosis of the no-signal state test will be described using FIG. 9. The self-diagnosis is actuated by a timer in the OLT controller 15 or input of a trigger from outside to the OLT controller 15 (step S141). The OLT controller 15 first performs steps S142, S143, S144, and S154. Those steps are the same as steps S102, S103, S104, and S113 having been described in FIG. 4. When the PON is in the non-protection state, the flow proceeds to the next [port test].

[Port Test]

The OLT controller 15 makes the optical switch 32 configure a circuit through optical switch controller 31 so that the port x and the port i are connected (step S145). Next, the normal system OSU 11-i transmits a gate signal for discovery to the subordinated OSU 50 (step S146). Next, the OLT controller 15 evaluates the light receiving states at the same time in the redundancy system OSU 12-x and the normal system OSU 11-i (step S147). When all the ONUs 50 are registered in the OSU 11, the OSU 11-i transmits the gate signal for discovery and sets the no-signal period (discovery window period ($T_D$)), the redundancy system OSU 12-x and the normal system OSU 11-i do not receive light during this time. Meanwhile, when a new ONU exists, the redundancy system OSU 12-x and the normal system OSU 11-i receive registration request signal light from the new ONU during the no-signal period. Namely, in the no-signal period (discovery window), when any one of the states is detected:

(d) a state in which the redundancy system OSU 12-x receives light when no new ONU is registered; and (e) a state in which the redundancy system OSU 12-x does not receive light when there is a new ONU, it can be determined that any of the optical switch 32, the optical switch controller 31, and the redundancy system OSU 12-x fails (step S148).

When (d) or (e) occurs, the OLT controller 15 records "at the time of configuration of no-signal circuit i" about the failure factor to output an alarm and, thus, to terminate the no-signal state test with respect to the port i (step S149). This alarm may be any of superimposition to an OAM signal, output to LED, output to a dedicated output terminal, and accumulation to a log.

Meanwhile, the above state evaluation is repeated within a prescribed time T at specified intervals t (t≤T) or a prescribed number of times, and if the phenomenon (d) or (e) does not occur during the prescribed time T, the OLT controller 15 determines that the failure of the optical switch 32, the optical switch controller 31, or the redundancy system OSU 12-x is not detected and terminates the circuit configuration test with respect to the port i (steps S150 and S151).

A similar no-signal state test is conducted with respect to ports other than the port i (steps S152 and S153). Steps S152 and S153 are similar respectively to steps S111 and S112 of FIG. 4.

Step S147 of FIG. 9 will be further described. In step S147, a light detection signal output from the OSU within a certain period may be used after input of the light. For example, the detection signal is a detection signal in the OSU conveniently called an SD (Signal Detect) signal. When the OSU receives the uplink signal light, the SD signal is in a signal reception state (High level in the example of FIG. 10), and the SD signal is in a signal non-reception state (Low level in the example of FIG. 10) with a reset signal generated for each SD observation period. Regarding the prescribed time T, mounting can be simplified by applying the SD observation period of the OSU. However, since the SD observation period may be different from each OSU, a countermeasure to the case will be hereinafter described. When the SD observation period of the normal system OSU 11-i is represented as $T_1$, and the SD observation period of the redundancy system OSU 12-x is represented as $T_2$, the normal system OSU 11-i transmits the gate signal for discovery; therefore, a discovery window period $T_D$ is integer times the SD observation period $T_1$, and it is assumed that there is no period of time during which the SD observation period and the discovery window period overlap.

Hereinafter, the behavior of the SD signal during the discovery window period $T_D$ in a case where no new OSU is registered will be described. As seen in FIG. 10, the SD signal of the normal system OSU 11-i is reset immediately before the discovery window period $T_D$ and is in the non-reception state. Since the discovery window period $T_D$ is integer times the SD observation period $T_1$, the SD signal of the normal system OSU 11-i maintains the non-reception state during the discovery window period $T_D$.

Meanwhile, the SD signal of the redundancy system OSU 12-x receives a reset signal when the discovery window period $T_D$ is started and then becomes the signal non-reception state. Accordingly, as seen in FIG. 10, such a condition that the SD observation period $T_2$ of the redundancy system OSU 12-x is included in the discovery window period $T_D$, and the non-reception state is maintained is $T_2 \leq T_D/2$. Namely, the condition is imposed, and moreover, the two kinds of SD signals (the SD signal of the normal system OSU 11-i and the SD signal of the redundancy system OSU 12-x) included during the discovery window period $T_D$ are compared with each other, whereby the failure determination of (d) can be performed.

Further, when the SD observation period $T_2$ of the redundancy system OSU 12-x included in the discovery window period $T_D$ is terminated, in order to allow the comparison between the two kinds of SD signals (the SD signal of the normal system OSU 11-i and the SD signal of the redundancy system OSU 12-x), the condition that $T_1 \leq T_2$ may be imposed as seen in FIG. 10.

As described above, when step S146 is mounted with the SD signal, such a setting is performed that $T_1 \leq T_2 \leq T_D/2$, at the same time, the two kinds of SD signals (the SD signal of the normal system OSU 11-i and the SD signal of the redundancy system OSU 12-x) are compared with each other when the SD observation period $T_2$ of the redundancy system OSU 12-x performed in the discovery window period $T_D$ of the normal system OSU 11-i is terminated, and when the latest SD signal of the redundancy system OSU 12-x shows the signal reception state, it can be determined that any of the optical switch 32, the optical switch controller 31, and the redundancy system OSU 12-x fails.

[Termination]

The OLT controller 15 terminates the "no-signal state test" for the M ports and thereafter terminates the self-diagnostic operation. When the PON protection is required to be performed during the self-diagnostic operation, the self-diagnostic operation is terminated.

The no-signal state test may be combined with the "(1) circuit configuration test" described in FIG. 4. Namely, in the "(1) circuit configuration test", steps S146, S147, S148, and S149 of the "no-signal state test" may be performed after the determination of "No" in step S107.

Hereinabove, the operation of the embodiment 1 has been described. If the failure of the optical switch 32, the optical switch controller 31, or the redundancy system OSU 12-x is discovered by the self-diagnosis, when the alarm is output from the OLT controller 15, an operator can exchange or repair these failed portions and perform maintenance before the PON protection.

The advantage of the embodiment 1 is that the "redundancy system OSU sharing type" of PON protection configuration of FIG. 2 is the same as a hardware configuration. Namely, since the technique can be realized by adding the control algorithm of this disclosure to the OLT controller 15 and the optical switch controller 31 in the "redundancy system OSU sharing type" of PON protection configuration of FIG. 2, introduction cost during mass production can be reduced.

Another advantage of the embodiment 1 is that the redundancy system OSU 12-*x* can be detected according to a portion. Namely, since each of the normal system OSUs 11-*i* performs communication at the time of non-protection of the PON, if a failure occurs, communication is interrupted, and this can be immediately detected; however, since the redundancy system OSU 12-*x* is in the standby state, no signal is input and output in the "redundancy system OSU type" of PON protection configuration of FIG. 2. However, in the self-diagnosis of the optical switch 32 of the embodiment 1, since the redundancy system OSU 12-*x* is used, the abnormality of the redundancy system OSU 12-*x* can be discovered.

Embodiment 2

Figure 6:
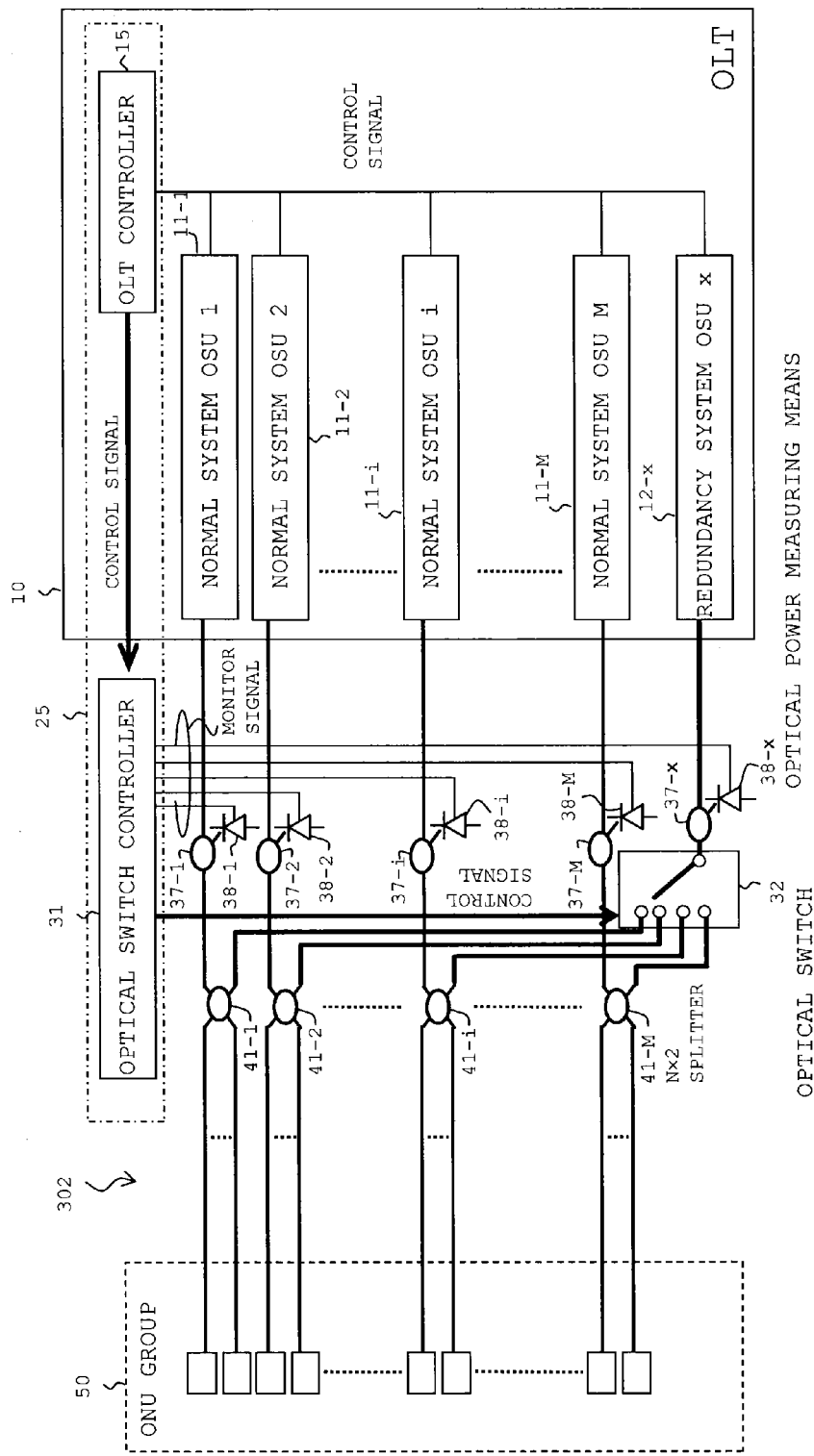
FIG. 6 is a view showing a configuration of the PON protection according to the present disclosure.

FIG. 6 is a view for explaining a configuration of a PON protection system 302 of this embodiment. In the PON protection system 302, a PON including a plurality of optical access networks connecting a normal system OSU 11 as a station-building side transmission device and one or more ONUs 50 as user side transmission devices in a point-to-multipoint is provided with a redundancy system OSU 12 which can communicate with the ONU 50 stored in an OSU 11 as a substitute for any of the OSUs 11, an optical switch 32 selectively connecting the redundancy system OSU 12 and any of optical access networks, and optical power measuring device 38 that measures the signal light to the normal system OSU 11 and the signal light to the redundancy system OSU 12 with optical power, a control circuit 25 which switches the optical switch 32 and performs a self-diagnostic method.

The PON protection system 302 is different from the PON protection system 301 of FIG. 3 in the following point. Namely, a splitter 37-*i* is connected to downlink of each normal system OSU 11-*i* (i is an integer not less than 1 and not more than M), and a splitter 37-*x* is connected to downlink of a redundancy system OSU 12-*x*. The splitter 37-*i* is used for branching and monitoring the uplink signal light input to each of the normal system OSUs 11-*i*. The splitter 37-*x* is used for branching and monitoring the uplink signal light input to the redundancy system OSU 12-*x*.

The optical power measuring means 38 is connected to each of the splitters 37 to allow measurement of the optical power of the branched uplink signal light. The optical power measuring means monitoring the optical power of the uplink signal light to the normal system OSU 11-*i* is referred to as optical power measuring means 38-*i*, and the optical power measuring means monitoring the optical power of the uplink signal light to the redundancy system OSU 12-*x* is referred to as the optical power measuring means 38-*x*. As those optical power measuring means 38, a photodiode and an A/D converter or general-purpose products such as an optical power meter may be used. The output of the optical power measuring means 38 is input to the optical switch controller.

Instead of connecting the splitter 37-*i* to a path from a splitter 41-*i* to the normal system OSU 11-*i*, the splitter 37-*i* may be connected to a path from the splitter 41-*i* to a port i of the optical switch 32. Alternatively, the splitter 37-*i* is not used, the splitter 41-*i* is replaced with an N:3 splitter, N ports are connected to the ONU, and three ports may be connected respectively to the normal system OSU 11-*i*, the port i of the optical switch 32, and the optical power measuring means 38-*i*.

Hereinafter, the self-diagnostic function of the optical switch 32 will be described. In this embodiment, the uplink signal light of the PON is used in test light in the self-diagnosis of the optical switch 32.

Figure 7:
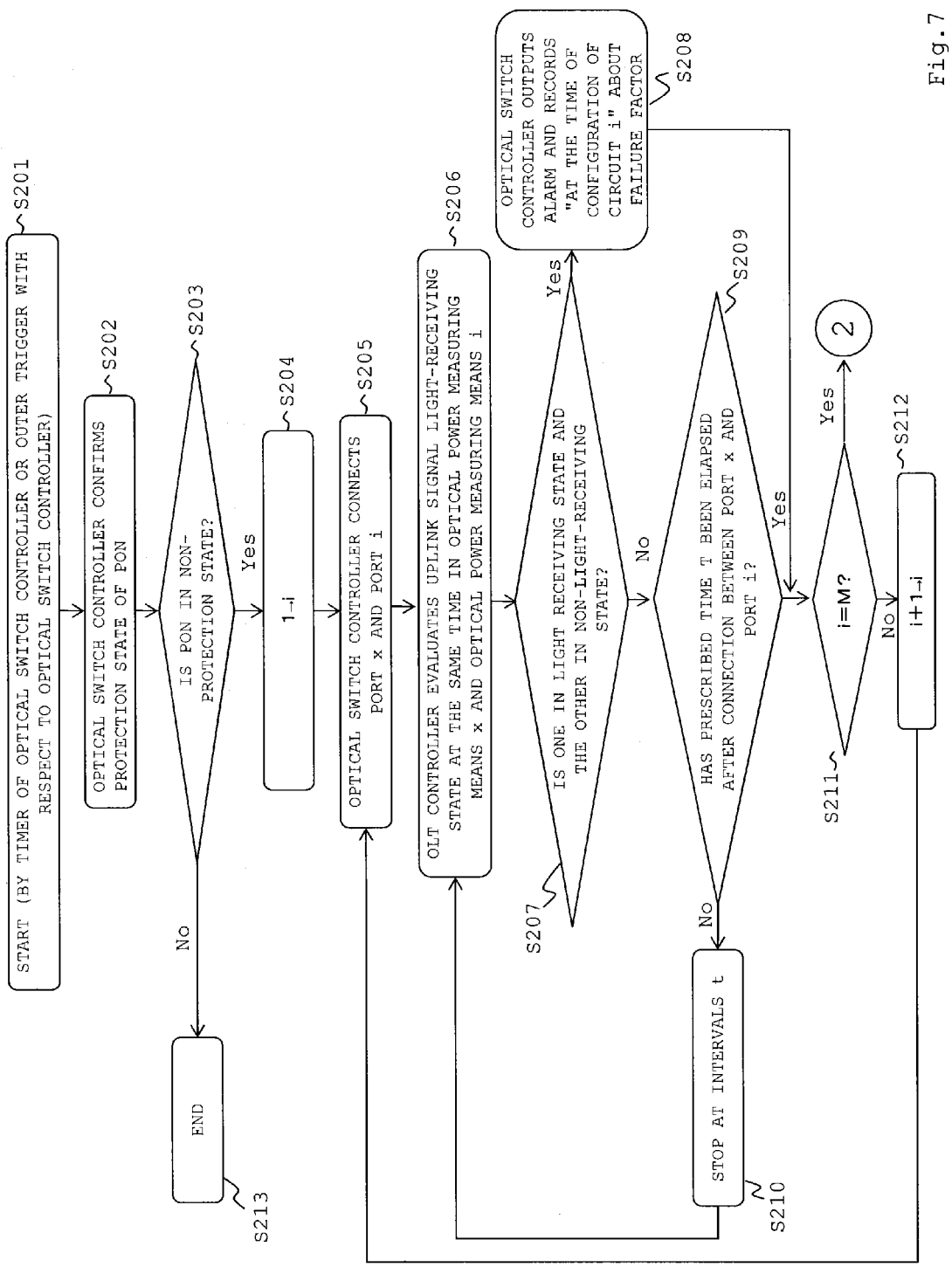
FIG. 7 is a view showing a flow chart of the PON protection according to the present disclosure.
Figure 8:
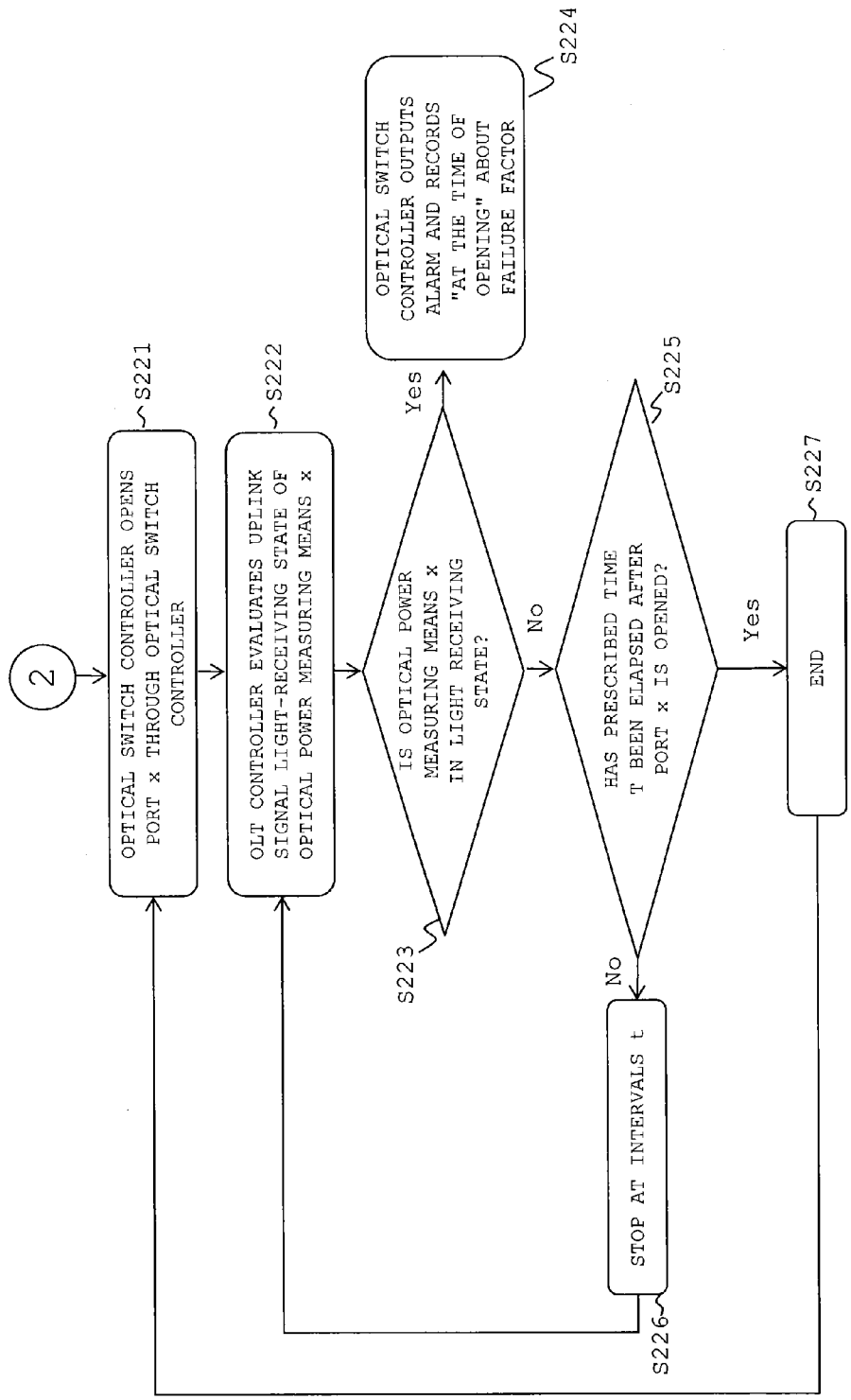
FIG. 8 is a view showing a flow chart of the PON protection according to the present disclosure.
Figure 11:
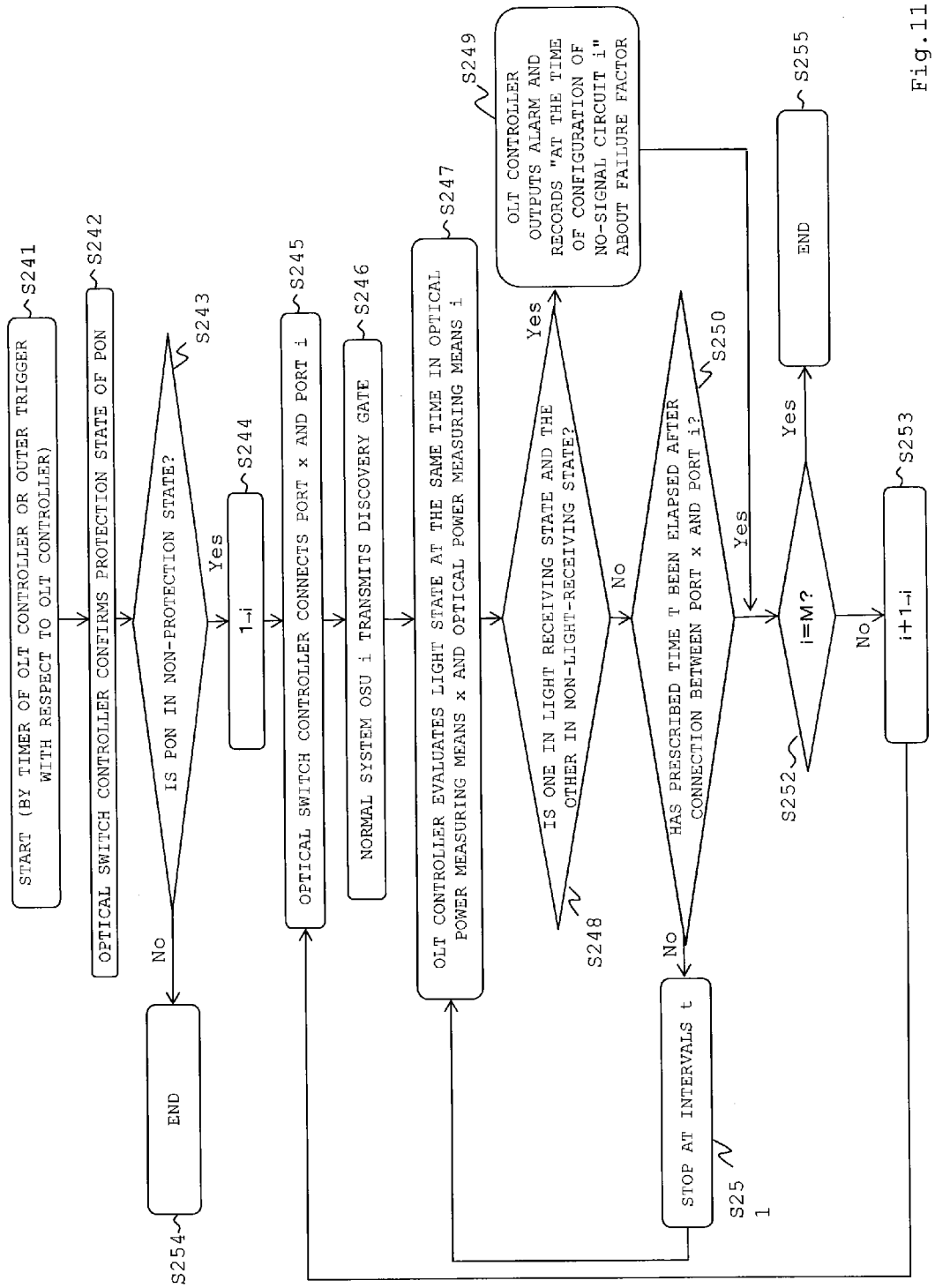
FIG. 11 is a view showing a flow chart of the PON protection according to the present disclosure.

The operation for the self-diagnosis is as follows. FIGS. 7, 8, and 11 show flow charts. In the self-diagnosis, it is premised that the PON is in the non-protection state. This embodiment is the same as the embodiment 1 in that the signal light to the normal system OSU 11-*i* and the signal light to the redundancy system OSU 12-*x* are monitored for a predetermined time of period to conduct the circuit configuration test and the open state test. However, although the state of the signal light is judged by the light receiving state of the OSU in the embodiment 1, this embodiment is different from the embodiment 1 in that the state of the signal light is judged by the optical power measuring means 38.

[Start]

The self-diagnosis is actuated by a timer in the optical switch controller 31 or input of a trigger from outside to the optical switch controller 31 (step S201). First, the optical switch controller 31 confirms that the PON is in the non-protection state. Since the instruction of protection is issued from the OLT controller 15 to the optical switch controller 31, the protection/non-protection state can be confirmed by referring to a memory in the optical switch controller 31 (in addition to this, the confirmation can be performed by referring to a memory in the normal system OSU 11-*i*, the redundancy system OSU 12-*x*, or the optical switch controller 31). When the PON is not in the non-protection state, the self-diagnosis is not performed (step S213). When the PON is in the non-protection state, the flow proceeds to the next [port test].

[Port Test]

In the optical switch 32, there are M combinations constituting a circuit while the port x on the redundancy system OSU 12 side is connected to the port (port i) on the ONU 50 side, and therefore, M types of "circuit configuration tests" are conducted. Since there is a release state (in which the port x on the OSU side is not connected to any other ports), an open state test is conducted once. Those test methods will be described. The order of the operations in those tests is arbitrary.

(1) Circuit Configuration Test (Steps S204 to S212)

The optical switch controller 31 makes the optical switch 32 configure a circuit connecting the port x and the port i (step S205). Next, the optical switch controller 31 evaluates the uplink signal light-receiving state at the same time in the optical power measuring means 38-*x* and the optical power measuring means 38-*i* (step S206). At this time, although the uplink signal light is not a stable light source, if the optical switch 32, the optical switch controller 31, the redundancy system OSU 12-*x*, and the normal system OSU 11-*i* are normally operated, the optical power measuring means 38-*x* and the optical power measuring means 38-*i* simultaneously receive light. Accordingly, when any one of the following states is detected:

(a) a state in which the optical power measuring means 38-*x* does not receive light, and the optical power measuring means 38-*i* receives light; and (b) a state in which the optical power measuring means 38-*x* receives light, and the optical power measuring means 38-*i* does not receive light, it can be determined that any of the optical switch 32, the optical switch controller 31, and the optical power measuring means 38 fails (steps S207 and S208). The Light reception/non-light reception of the optical power measuring means 38-*x* and the optical power measuring means 38-*i* may be determined from the fact that the uplink signal light of an electric power of not less than a threshold value is received or not received during measurement.

When (a) or (b) occurs, the optical switch controller 31 records "at the time of configuration of circuit i" about the failure factor to output an alarm and, thus, to terminate the circuit configuration test with respect to the port i (step S208). This alarm may be any of output to the OLT controller 15 through a line, output to LED, output to a dedicated output terminal, and accumulation to a log.

Meanwhile, the above state evaluation is repeated within a prescribed time T at prescribed intervals t (t≤T) or a prescribed number of times, and if the phenomenon (a) or (b) does not occur during the prescribed time T, the optical switch controller 31 determines that the failure of the optical switch 32, the optical switch controller 31, or the optical power measuring means 38 is not detected and terminates the circuit configuration test with respect to the port i (steps S209 and S210).

The above is a flow of the circuit configuration test with respect to a specified port i. A similar circuit configuration test is conducted with respect to other ports (steps S211 and S212). In the circuit configuration test, i may be monotonically increased from 1 to M or monotonically reduced from M to 1 and may be changed arbitrarily. Although FIG. 7 is a flow in which i is monotonically increased from 1 to M, this disclosure is not limited thereto.

(2) Open State Test

The optical switch controller 31 makes the optical switch 32 configure a circuit so that the port x is in the open state (a state in which the port x is not connected to any other ports). Next, the optical switch controller 31 evaluates the light receiving state of the uplink signal light in the optical power measuring means 38-x. At this time, although the uplink signal light is not a stable light source, if the optical switch 32, the optical switch controller 31, the optical power measuring means 38-x are normally operated, the optical power measuring means 38-x does not receive light. Accordingly, when the following state is detected:

(c) a state in which the optical power measuring means 38-x receives light, it can be determined that any of the optical switch 32, the optical switch controller 31, and the optical power measuring means 38-x fails (steps S213). The light reception/non-light reception of the optical power measuring means 38-x may be determined from the fact that the uplink signal light of an electric power of not less than a threshold value is received or not received during measurement.

When (c) occurs, the optical switch controller 31 records "at the time of opening" about the failure factor to output an alarm and, thus, to terminate the open state test (step 224). This alarm may be any of output to the OLT controller through a line, output to LED, and output to a dedicated output terminal.

Meanwhile, the above state evaluation is repeated within a prescribed time T at prescribed intervals t (t≤T) or a prescribed number of times, and if the phenomenon (c) does not occur during the prescribed time T, it is regarded that failures of the optical switch 32, the optical switch controller 31, and the optical power measuring means 38-x are not detected, and the open state test is terminated (steps S225, S226 and S227).

Since there is such an optical switch that the port x cannot be set to the open state, the open state test may not be conducted. The open state test may be conducted before or after the circuit configuration test or between the circuit configuration tests. Although FIGS. 7 and 8 are flows in which the open state test is conducted after the circuit configuration test, this disclosure is not limited thereto.

[Termination]

The optical switch controller 31 terminates the "circuit configuration test" for the M ports and the one time open state test and thereafter terminates the self-diagnostic operation. When the PON protection is required to be performed during the self-diagnostic operation, the self-diagnostic operation is terminated.

(3) No-Signal State Test

Figure 12:
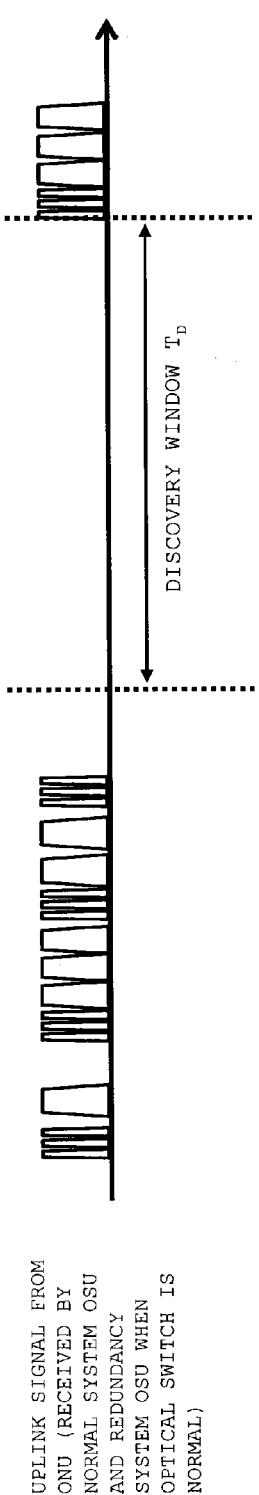
FIG. 12 is a view for explaining the discovery window.

In the configuration of the embodiment 2, the no-signal state test having been described in the embodiment 1 can be conducted. FIG. 12 shows the discovery window in the OSU in this embodiment. Also in this embodiment, the no-signal period may be discovery window.

[Start]

The self-diagnosis of the no-signal state test will be described using FIG. 11. Steps S241, S242, S243, S244, and S254 are the same respectively as steps S141, S142, S143, S144, and S154 in FIG. 9. When the PON is in the non-protection state in step S243, the flow proceeds to the next [port test].

[Port Test]

Step S245 is the same as step S145 of FIG. 9. Next, the normal system OSU 11-i transmits a gate signal for discovery to the subordinated OSU 50 (step S246). Next, the OLT controller 15 evaluates the light receiving states at the same time in the redundancy system OSU 12-x and the normal system OSU 11-i with the use of the optical power measuring means 38 (step S247). Namely, in the no-signal period (discovery window), when any one of the states is detected:

(d) a state in which the optical power measuring means 38-x receives light when no new ONU is registered; and (e) the optical power measuring means 38-x does not receive light when there is a new ONU, it can be determined that any of the optical switch 32, the optical switch controller 31, and the redundancy system OSU 12-x fails (step S248).

Steps S249 to S255 are the same as steps S149 to S155 of FIG. 9.

[Termination]

The OLT controller 15 terminates the "no-signal state test" for the M ports and thereafter terminates the self-diagnostic operation. When the PON protection is required to be performed during the self-diagnostic operation, the self-diagnostic operation is terminated.

The no-signal state test may be combined with the "(1) circuit configuration test" described in FIG. 7. Namely, in the "(1) circuit configuration test", steps S246, S247, S248, and S249 of the "no-signal state test" may be performed after the determination of "No" in step S207.

Hereinabove, the operation of the embodiment 2 has been described. If the failure of the optical switch 32, the optical switch controller 31, the optical power measuring means 38-x, or the optical power measuring means 38-i is discovered by the self-diagnosis, when the alarm is output from the optical switch controller 31, an operator can exchange or repair these failed portions and perform maintenance before the PON protection.

The advantage of the embodiment 2 is that in the self-diagnostic operation, a control software of the OLT controller is not required to be modified. Namely, the optical power of the test light in the self-diagnosis is measured by not the OSU, but the newly provided optical power measuring means 38, and the measurement result is input to the optical switch controller 31. Accordingly, all control algorithms of the self-diagnosis can be stored in the optical switch controller 31. As an addition to the self-diagnosis between the OLT controller 15 and the optical switch controller 31, an instruction of start of the self-diagnosis and reception of the results are considered at most. When the optical switch controller 31 is provided with a timer for activation of self-diagnosis and an OAM output terminal directly outputting the results, even the above addition is not required. This means that the self-diagnostic function of the optical switch can be added only by corresponding to the OLT of the "redundancy system OSU sharing type" of PON protection of FIG. 2 only on the optical switch controller 31 side.

The following is a description of the self-diagnostic method in the PON protection system of this embodiment.

(1) In the PON protection system which is constituted of an optical subscriber line terminal station device constituted of an optical subscriber line terminal station device controller, M (M is an integer not less than 1) normal system optical subscriber line termination boards i (i is an integer not less than 1 and not more than M), and a redundancy system optical subscriber line termination board, an M:1 optical switch in which arbitrary input and output port i (i is an integer not less than 1 and not more than M) in M inputs and output ports can be connected to an input and output port x, an optical switch controller controlling the M:1 optical switch, and M N:2 splitters i (i is an integer not less than 1 and not more than M) (N is an integer not less than 1) and in which the optical subscriber line terminal station device controller is connected to a control line of the normal system optical subscriber line termination board i, the optical subscriber line terminal station device controller is connected to a control line of the redundancy system optical subscriber line termination board, the optical subscriber line terminal station device controller is connected to a control line of the optical switch controller, the optical switch controller is connected to a control line of the M:1 optical switch, one of two branched N:2 splitters i is connected to an optical input and output terminal of the normal system optical subscriber line termination board i, the other branched N:2 splitter i is connected to the port i of the M:1 optical switch, and a port x of the M:1 optical switch is connected to the optical input and output terminal of the redundancy system optical subscriber line termination board, a self-diagnostic method for PON protection includes a step 1 in which the optical subscriber line terminal station device controller starts the self-diagnostic operation in the wake of a timer or an external trigger when the PON is in the non-protection state and terminates the self-diagnostic operation when the PON is in the protection state, a step 2-i in which when the self-diagnosis operation is started, the optical subscriber line terminal station device controller configures a circuit connecting the port x and the port i through the optical switch controller, the optical subscriber line terminal station device controller repeats simultaneous evaluation of the light receiving state of the normal system optical subscriber line termination board i and the light receiving state of the redundancy system optical subscriber line termination board within a prescribed time, during the evaluation, when one of the normal system optical subscriber line termination board i and the redundancy system optical subscriber line termination board is in the light receiving state, and the other is in the non-light-receiving state, the optical subscriber line terminal station device controller outputs an alarm, and a step 3 in which the optical subscriber line terminal station device controller terminates the self-diagnostic operation, and the step 2-i is performed with respect to all integers in which i is not less than 1 and not more than M in an arbitrary order.

(2) The self-diagnostic method in the PON protection system described in (1) has a step 4 in which an open state in which the optical subscriber line terminal station device controller is not connected to any of the port x and an arbitrary port i is not less than 1 and not more than M) is configured through the optical switch controller, the optical subscriber line terminal station device controller repeats evaluation of the light receiving state of the redundancy system optical subscriber line termination board within a prescribed time, and during the evaluation, when redundancy system optical subscriber line termination board is in the light receiving state, the optical subscriber line terminal station device controller outputs an alarm, and the step 4 is executed before or after an arbitrary step of the steps 2-i (i is not less than 1 and not more than M).

(3) In the PON protection system which is constituted of an optical subscriber line terminal station device constituted of an optical subscriber line terminal station device controller, M (M is an integer not less than 1) normal system optical subscriber line termination boards i (i is an integer not less than 1 and not more than M), and a redundancy system optical subscriber line termination board, an M:1 optical switch in which arbitrary input and output port i (i is an integer not less than 1 and not more than M) of M input and output ports can be connected to an input and output port x, an optical switch controller controlling the M:1 optical switch, and M N:2 splitters i (i is an integer not less than 1 and not more than M) (N is an integer not less than 1) and in which the optical subscriber line terminal station device controller is connected to a control line of the normal system optical subscriber line termination board i, the optical subscriber line terminal station device controller is connected to a control line of the redundancy system optical subscriber line termination board, the optical subscriber line terminal station device controller is connected to a control line of the optical switch controller, the optical switch controller is connected to a control line of the M:1 optical switch, one of two branched N:2 splitters i is connected to an optical input and output terminal of the normal system optical subscriber line termination board i, the other branched N:2 splitter i is connected to the port i of the M:1 optical switch, and a port x of the M:1 optical switch is connected to the optical input and output terminal of the redundancy system optical subscriber line termination board, the method includes a step 1 in which a splitter i (i is an integer not less than 1 and not more than M) is provided between one of the two branched N:2 splitters i and an optical input and output terminal of the normal system optical subscriber line termination board i or between the other branched N:2 splitter i and a port i of the M:1 optical switch, the splitter i is connected to optical power measuring means i (i is an integer not less than 1 and not more than M) for monitoring uplink signal light, a splitter x is provided between the port x of the M:1 optical switch and an optical input and output terminal of the redundancy system optical subscriber line termination board, optical power measuring means x for monitoring uplink signal light is connected to the splitter x, the optical switch controller and an output of the optical power measuring means i are connected, the optical switch controller and an output of the optical power measuring means x are connected, the optical switch controller starts self-diagnostic operation in the wake of a timer or an external trigger when the PON is in a non-protection state and terminates the self-diagnostic operation when the PON is in the protection state, a step 2-i in which when the self-diagnostic operation is started, the optical switch controller configures a circuit connecting the port x and the port i, the optical switch controller repeats simultaneous evaluation of the light receiving state of the optical power measuring means i and the light receiving state of the optical power measuring means x within a prescribed time, and during the evaluation, when one of the optical power measuring means i and the optical power measuring means x is in the light receiving state, and the other is in the non-light-receiving state, the optical switch controller outputs an alarm, and a step 3 in which the optical switch controller terminates the self-diagnostic operation, and the step 2-i is performed with respect to all integers in which i is not less than 1 and not more than M in an arbitrary order.

The self-diagnostic method for PON protection system described in (3) has a step 4 in which the optical switch controller configures an open state in which the optical switch controller is not connected to any of the port x and an arbitrary port i (i is not less than 1 and not more than M), the optical switch controller repeats evaluation of the light receiving state of the optical power measuring means x within a prescribed time, and during the evaluation, when the optical power measuring means x is in the light receiving state, the optical switch controller outputs an alarm, and the step 4 is executed before or after an arbitrary step of the steps 2-i (i is not less than 1 and not more than M).

REFERENCE SIGNS LIST

10: OLT
11, 11-1, 11-2, ..., 11-i, ..., 11-M: Normal system OSU
12, 12-x: Redundancy system OSU
15: OLT controller
25: Control circuit
31: Optical switch controller
32: Optical switch
37, 37-1, 37-2, ..., 37-i, ..., 37-M, 37-x: Splitter
38, 38-1, 38-2, ..., 38-i, ..., 38-M, 38-x: Optical power measuring means
41, 41-1, 41-2, ..., 41-i, ..., 41-M: N×2 splitter
50, 51, 51-1, 51-2, 51-3: ONU
301, 302: PON protection system

The invention claimed is:

1. A self-diagnostic method for a Passive Optical Network (PON) protection system in a PON including a plurality of optical access networks connecting normal system Optical Subscriber Units (OSUs) as station-building side transmission devices to one or more Optical Network Units (ONUs) as user side transmission devices in a point-to-multipoint communication system, the method comprising:

providing a redundancy system OSU that communicates with the ONUs in communication with the normal system OSUs, wherein the redundancy system OSU acts as a substitute for any of the normal system OSUs by switching an optical switch;

conducting a circuit configuration test such that, when the redundancy system OSU is in a standby state, a circuit is configured by switching the optical switch so that a signal light from an ONU is input to both the normal system OSU and the redundancy system OSU of the optical access network that includes the ONU sending the signal light;

monitoring the signal light to the normal system OSU and the signal light to the redundancy system OSU for a predetermined time period, and determining that an abnormality exists when the signal light to one of the normal system OSUs and the signal light to the redundancy system OSU do not correspond to each other.

2. The self-diagnostic method according to claim 1, wherein the conducting and monitoring are repeated a plurality of times.

3. The self-diagnostic method according to claim 1, wherein the signal light is monitored in the normal system OSUs and the redundancy system OSU for a predetermined time period.

4. The self-diagnostic method according to claim 2, wherein the signal light to the normal system OSU and the signal light to the redundancy system OSU are monitored for a predetermined time period.

5. A self-diagnostic method for a Passive Optical Network (PON) protection system PON including a plurality of optical access networks connecting normal system Optical Subscriber Units (OSUs) as station-building side transmission devices to one or more Optical Network Units (ONUs) as user side transmission devices in a point-to-multipoint communication system, the method comprising:

providing a redundancy system OSU that communicates with the ONUs in communication with the normal system OSUs, wherein the redundancy system OSU acts as a substitute for any of the normal system OSUs by switching an optical switch;

conducting an open state test such that, when the redundancy system OSU is in a standby state, the optical switch is opened so that a signal light from an ONU is input only to the normal system OSUs of the optical access network that includes the ONU sending the signal light, opening the circuits of the redundancy system OSU and the ONU sending the signal light;

monitoring the signal light to the redundancy system OSU for a predetermined time period; and determining that an abnormality exists when the signal light to the redundancy system OSU is present.

6. The self-diagnostic method according to claim 5, wherein the conducting, opening and monitoring are repeated a plurality of times.

7. The self-diagnostic method according to claim 6, wherein the signal light is monitored in the redundancy system OSU for a predetermined time period.

8. The self-diagnostic method according to claim 5, wherein the signal light to the redundancy system OSU is monitored by optical power measurement.

9. A self-diagnostic method for Passive Optical Network (PON) protection system in a PON including a plurality of optical access networks connecting normal system Optical Subscriber Units (OSUs) as station-building side transmission devices to one or more Optical Network Units (ONUs) as user side transmission devices in a point-to-multipoint communication system, the method comprising:

providing a redundancy system OSU that communicates with the ONUs in communication with the normal system OSUs, wherein the redundancy system OSU acts as a substitute for any of the normal system OSUs by switching an optical switch;

conducting no-signal state test such that, when the redundancy system OSU is in a standby state, a circuit is configured by switching the optical switch so that a signal light from an ONU is input to both the normal system OSU and the redundancy system OSU of the optical access network that includes the ONU sending the signal light;

creating a no-signal period in which transmission of the signal light to all registered ONUs is stopped;

monitoring the signal light to the normal system OSU and the signal light to the redundancy system OSU for the no-signal period; and determining that an abnormality exists when the signal light to the normal system OSUs and the signal light to the redundancy system OSU do not correspond to each other.

10. The self-diagnostic method according to claim 9, wherein the creating and monitoring are repeated a plurality of times.

11. The self-diagnostic method for PON protection according to claim 9, wherein the no-signal period is a discovery window.

12. The self-diagnostic method for PON protection system according to claim 9, wherein a light detection signal output from the normal system OSU and the redundancy system OSU is used for a predetermined time period after input of the signal light.

13. The self-diagnostic method for PON protection system according to claim 12, wherein, if the time at which the normal system OSU outputs the light detection signal is represented as $T_1$, and if the time at which the redundancy system OSU outputs the light detection signal is represented as $T_2$, then the time of the no-signal period is represented as $T_D$, $T_1 \leq T_2 \leq T_D/2$.

14. The self-diagnostic method for PON protection system according to claim 9, wherein the light to the normal system OSU and the light to the redundancy system OSU are monitored by optical power measurement.

15. A protection system in a Passive Optical Network (PON) including a plurality of optical access networks connecting normal system Optical Subscriber Units (OSUs) as station-building side transmission devices to one or more Optical Network Units (ONUs) as user side transmission devices in a point-to-multipoint communication system, the protection system comprising:

a redundancy system OSU that communicates with ONUs in communication with the normal system OSUs, wherein the redundancy system OSU acts as a substitute for any of the normal system OSUs;

an optical switch which selectively connects the redundancy system OSU and any of the optical access networks; and a control circuit which switches the optical switch and performs the self-diagnostic method according to claim 1.

16. A protection system in a Passive Optical Network (PON) including a plurality of optical access networks connecting normal system Optical Subscriber Units (OSUs) as station-building side transmission devices to one or more Optical Network Units (ONUs) as user side transmission devices in a point-to-multipoint communication system, the protection system comprising:

a redundancy system OSU that communicates with the ONUs in communication with the normal system OSUs, wherein the redundancy system OSU acts as a substitute for any of the normal system OSUs;

an optical switch which selectively connects the redundancy system OSU and any of the optical access networks;

optical power measuring means that measures a signal light to the normal system OSU and a signal light to the redundancy system OSU with optical power; and a control circuit which switches the optical switch and performs the self-diagnostic method according to claim 1.

17. The system according to claim 15, wherein the conducting and monitoring are repeated a plurality of times.

18. The system according to claim 15, wherein in the conducting and monitoring, the signal light is monitored in the normal system OSU and the redundancy system OSU for a predetermined time period.

19. The system according to claim 16, wherein the conducting and monitoring are repeated a plurality of times.

20. The system according to claim 16, wherein in the conducting and monitoring, the signal light to the normal system OSU and the signal light to the redundancy system OSU are monitored for a predetermined time period.

21. A protection system in a Passive Optical Network (PON) including a plurality of optical access networks connecting normal system Optical Subscriber Units (ONUs) as station-building side transmission devices to one or more Optical Network Units (ONUs) as user side transmission devices in a point-to-multipoint communication system, the protection system comprising:

a redundancy system OSU that communicates with the ONUs in communication with the normal system OSUs, wherein the redundancy system OSU acts as a substitute for any of the normal system OSUs;

an optical switch which selectively connects the redundancy system OSU and any of the optical access networks; and a control circuit which switches the optical switch and performs the self-diagnostic method according to claim 5.

22. The system according to claim 21, wherein the conducting, opening and monitoring are is repeated a plurality of times.

23. The system according to claim 21, wherein in the conducting, opening and monitoring, the signal light is monitored in the redundancy system OSU for a predetermined time period.

24. A protection system in a Passive Optical Network (PON) including a plurality of optical access networks connecting normal system Optical Subscriber Units (OSUs) as station-building side transmission devices to one or more (Optical Network Units (ONUs) as user side transmission devices in a point-to-multipoint communication system, the protection system comprising:

a redundancy system OSU that communicates with the ONUs in communication with the normal system OSUs, wherein the redundancy system OSU acts as a substitute for any of the normal system OSUs;

an optical switch which selectively connects the redundancy system OSU and any of the optical access networks; and a control circuit which switches the optical switch and performs the self-diagnostic method according to claim 9.

25. The system according to claim 24, wherein the creating and monitoring are repeated a plurality of times.

26. The system according to claim 24, wherein the no-signal period is a discovery window.

27. The system according to claim 24, wherein in the creating and monitoring, a light detection signal output from a normal system OSU and the redundancy system OSU is used for a predetermined time period after input of the signal light.

28. The system according to claim 27, wherein, if the time at which the normal system OSU outputs the light detection signal is represented as $T_1$, and if the time at which the redundancy system OSU outputs the light detection signal is represented as $T_2$, then the time of the no-signal period is represented as $T_D$, $T_1 \leq T_2 \leq T_D/2$.

29. A protection system in a Passive Optical Network (PON) including a plurality of optical access networks connecting normal system Optical Subscriber Units (OSUs) as station-building side transmission devices to one or more Optical Network Units (ONUs) as user side transmission devices in a point-to-multipoint communication system, the protection system comprising:

a redundancy system OSU that communicates with the ONUs in communication with the normal system OSUs, wherein the redundancy system OSU acts as a substitute for any of the normal system OSUs;

an optical switch which selectively connects the redundancy system OSU and any of the optical access networks;

optical power measuring means that measures a signal light to the normal system OSU and a signal light to the redundancy system OSU with optical power; and a control circuit which switches the optical switch and performs the self-diagnostic method according to claim 5.

30. The system according to claim 29, wherein the conducting, opening and monitoring are repeated a plurality of times.

31. The system according to claim 29, wherein in the conducting, opening and monitoring, the signal light to the redundancy system OSU is monitored by optical power measurement for a predetermined time period.

32. A protection system in a Passive Optical Network (PON) including a plurality of optical access networks connecting normal system Optical Subscriber Units (OSUs) as station-building side transmission devices to one or more Optical Network Units (ONUs) as user side transmission devices in a point-to-multipoint communication system, the protection system comprising:

a redundancy system OSU that communicates with the ONUs in communication with the normal system OSUs, wherein the redundancy system OSU acts as a substitute for any of the OSUs;

an optical switch which selectively connects the redundancy system OSU and any of the optical access networks;

optical power measuring means that measures a signal light to the normal system OSU and a signal light to the redundancy system OSUs with optical power; and a control circuit which switches the optical switch and performs the self-diagnostic method according to claim 9.

33. The system according to claim 32, wherein the creating and monitoring are repeated a plurality of times.

34. The system according to claim 32, wherein the no-signal period is a discovery window.

35. The system according to claim 32, wherein in the creating and monitoring are, the light to the normal system OSU and the light to the redundancy system OSU are monitored by optical power measurement.

* * * * *